(12) United States Patent
Stier et al.

(10) Patent No.: US 6,493,697 B1
(45) Date of Patent: Dec. 10, 2002

(54) METHOD OF SELECTING DESIRED DOMAINS AND FOR DEVELOPING A SEEDING METHODOLOGY FOR A KNOWLEDGE BASE SYSTEM

(75) Inventors: Sharon Stier, Wrentham, MA (US); Debra Ann Haughton, Attleboro, MA (US)

(73) Assignee: Stream International, Inc., Canton, MA (US)

( * ) Notice: Subject to any disclaimer, the term of this patent is extended or adjusted under 35 U.S.C. 154(b) by 0 days.

(21) Appl. No.: 09/379,822

(22) Filed: Aug. 24, 1999

(51) Int. Cl.$^7$ ................................................. G06N 5/02
(52) U.S. Cl. ........................... 706/50; 707/6; 707/101; 707/102; 707/104
(58) Field of Search .......................... 706/50, 45, 46, 706/59; 707/5, 3; 700/286, 97; 714/26

(56) References Cited

U.S. PATENT DOCUMENTS

| | | | | |
|---|---|---|---|---|
| 4,823,306 A | * | 4/1989 | Barbic et al. .................. | 707/5 |
| 5,251,131 A | * | 10/1993 | Masand et al. ................ | 704/9 |
| 5,659,724 A | * | 8/1997 | Borgida et al. ................ | 707/3 |
| 5,745,895 A | * | 4/1998 | Bingham et al. .............. | 707/10 |
| 6,236,994 B1 | * | 5/2001 | Swartz et al. .................. | 707/6 |
| 2001/0007989 A1 | * | 7/2001 | Mittal et al. ................. | 707/200 |

\* cited by examiner

*Primary Examiner*—Thomas Black
*Assistant Examiner*—Joseph P. Hirl
(74) *Attorney, Agent, or Firm*—Maura K. Moran

(57) ABSTRACT

A method and a domain candidate benefit indicator for selecting knowledge domains for a knowledge base from at least one domain candidate involves developing a domain candidate benefit value for each domain candidate. Domain selection is based on a comparison of the domain candidate benefit values, which are numerical values developed by identifying for each domain candidate at least one forecasting attribute having an ability to forecast an extent of benefit of selecting the domain candidate to be the selected domain. Sub-domains may be selected by identifying sub-domain candidates in the selected domain and developing a sub-domain candidate benefit value for each sub-domain candidate. The selected sub-domain is selected based on a comparison of sub-domain candidate benefit values. The domain selection methodology may also be used to develop a knowledge base seeding methodology.

50 Claims, 18 Drawing Sheets

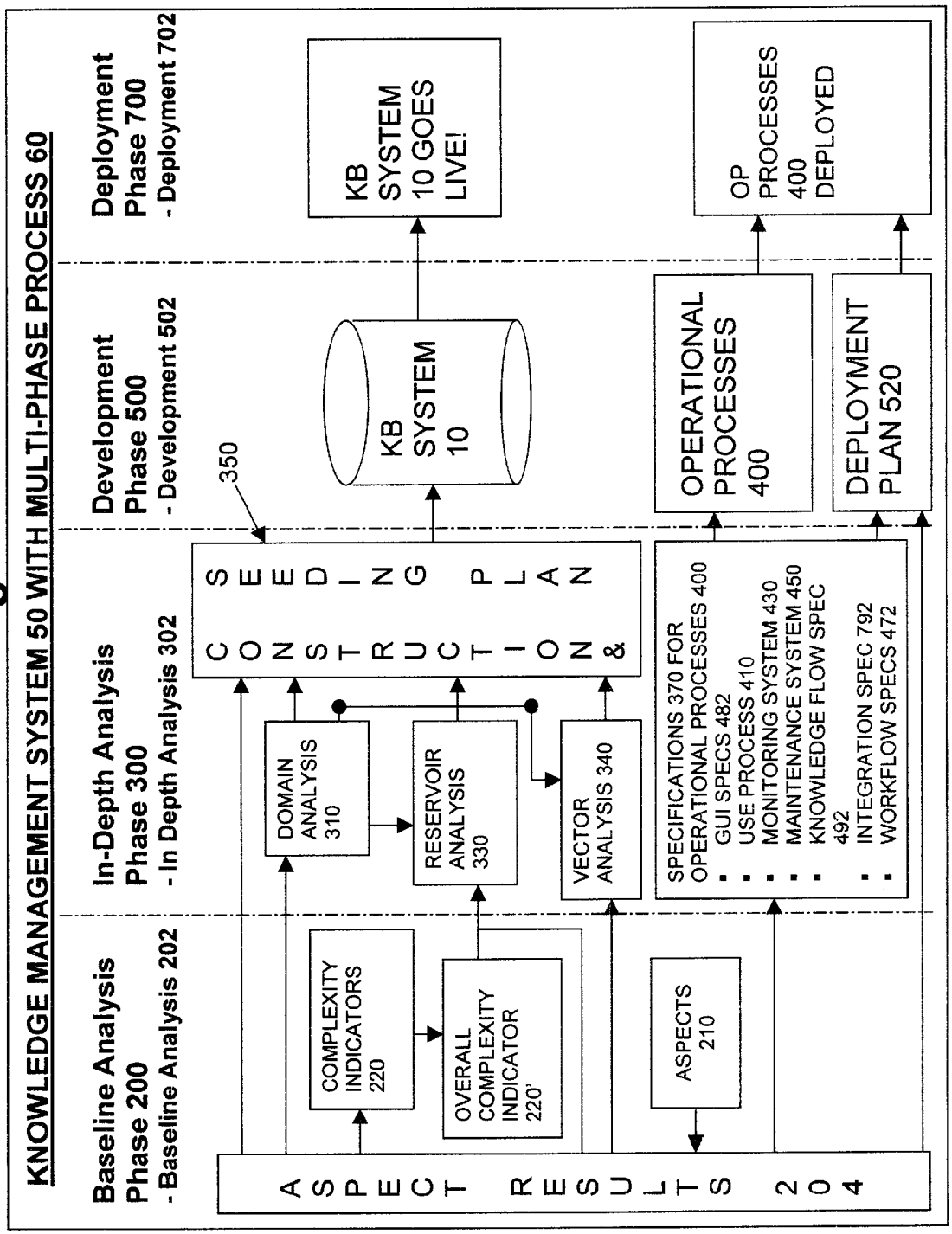

| MAKE UP OF SUPPORT TEAM: | IDENTIFY TEAM: _____ |
|---|---|
| LEVEL OF COMPLEXITY: | LOW  MEDIUM  HIGH |

| GOALS OF POTENTIAL BENEFICIARIES: | IDENTIFY BENEFICIARIES: ____ |
|---|---|

IDENTIFY GOALS: _____

| LEVEL OF COMPLEXITY: | LOW  MEDIUM  HIGH |
|---|---|

| WORKFLOW: | DESCRIBE WORKFLOW: _____ |
|---|---|
| LEVEL OF COMPLEXITY | LOW  MEDIUM  HIGH |

| SURROUNDING SYSTEM ENVIRONMENT: | IDENTIFY SYSTEMS: _____ |
|---|---|
| LEVEL OF COMPLEXITY | LOW  MEDIUM  HIGH |

| TOOLS AVAILABLE TO TRACK METRICS: | IDENTIFY METRICS: _____ |
|---|---|

IDENTIFY TOOLS: _____

| LEVEL OF COMPLEXITY | LOW  MEDIUM  HIGH |
|---|---|

| POTENTIAL DOMAIN: | IDENTIFY DOMAINS: _____ |
|---|---|
| LEVEL OF COMPLEXITY | LOW  MEDIUM  HIGH |

| POTENTIAL RESERVOIRS: | IDENTIFY RESERVOIRS: _____ |
|---|---|
| LEVEL OF COMPLEXITY | LOW  MEDIUM  HIGH |

OVERALL COMPLEXITY:

| LEVEL OF COMPLEXITY | LOW  MEDIUM  HIGH |
|---|---|

Fig. 10

KNOWLEDGE DOMAIN INDICATOR 316

| | | | | P1 | | P2 | | |
|---|---|---|---|---|---|---|---|---|
| | | | WT. | SCORE | VALUE | SCORE | VALUE | |
| F | F1 | | | 0 | 0 | 0 | 0 | |
| U | % OF QUEUE | | 4 | 2 | 8 | 4 | 16 | |
| N | FTF | | 3 | 1 | 3 | 1 | 3 | |
| C | ESC TO MENTOR | | 2 | 2 | 4 | 2 | 4 | |
| T | ESC TO CUSTOMER | | 3 | 1 324d | 3 | 1 | 3 | |
| I | MEASURABILITY | | 3 | 5 | 15 | 6 | 18 | 311b |
| O | PORTION OF TRAINING | | 2 | 1 | 2 | 3 | 6 | |
| N | REPETITION % | | 2 | 2 | 4 | 2 | 4 | |
| A | AHT GAP | | 3 | 1 | 3 | 1 | 3 | |
| L | LEVERAGE-ABILITY | | 5 | 1 324h | 5 | 3 | 15 | |
| | | | | | 42 | | 57 | 99 |
| | F2 | | | | | | | |
| D | % OF QUEUE | | 4 | 0 | 4 | 4 | 16 | |
| O | FTF | | 3 | 1 | 3 | 1 | 3 | |
| M | ESC TO MENTOR | | 2 | 2 | 4 | 1 | 2 | |
| A | ESC TO CUSTOMER | | 3 | 0 | 3 | 1 | 3 | |
| I | MEASURABILITY | | 3 | 5 | 15 | 6 | 18 | |
| N | PORTION OF TRAINING | | 2 | 0 | 2 | 1 | 2 | |
| S | REPETITION % | | 2 | 0 | 2 | 2 | 4 | |
| | AHT GAP | | 3 | 1 | 3 | 1 | 3 | |
| | LEVERAGE-ABILITY | | 5 | 1 | 5 | 3 | 15 | |
| | | | | | 41 | | 66 | 101 |
| | TOTALS | | | | 83 | | 123 | |

PROCESS 390 FOR DEVELOPING SEEDING METHODOLOGY 380

STEP 391: DEVELOP SEEDING PRIORITY VALUE 384 FOR EACH SUB-DOMAIN BY FOLLOWING STEP 304 OF DOMAIN ANALYSIS REVIEW 314

- STEP 304'A: IDENTIFY SUB-DOMAINS 382
- STEP 304'B: IDENTIFY SELECTED CHARACTERISTICS 392
- STEP 304'C: ESTABLISH CHARACTERISTIC VALUATION SYSTEM 395 FOR EACH CHARACTERISTIC
- STEP 304'D: DEVELOP ACTUAL CHARACTERISTIC VALUE 96 FOR EACH CHARACTERISTIC 392 OF EACH SUB-DOMAIN
- STEP 304'E: COMBINE ACTUAL CHARACTERISTIC VALUES 96 TO GENERATE POTENTIAL DOMAIN SUITABILITY VALUE 384

STEP 393: DEVELOP SEEDING ORDER INDICATOR DOMAIN 93 TO COMPARE SEEDING PRIORITY VALUES 384

STEP 394: DEVELOP PREFERRED SEEDING ORDER 386 BASED ON COMPARISON

Fig. 14b

STEP 394: ASSIGN A SEEDING ORDER ASSIGNMENT 381 TO EACH SUB-DOMAIN 382 BY FOLLOWING STEP 306 OF DOMAIN ANALYSIS 314

STEP 394A:
- IDENTIFY THE SUB-DOMAIN 382A HAVING THE HIGHEST SEEDING PRIORITY VALUE 384A
- ASSIGN A FIRST SEEDING ORDER ASSIGNMENT 381A TO THE SUB-DOMAIN 382A
- REMOVE SUB-DOMAIN 382A FROM THE SET OF SUB-DOMAINS 382

STEP 394B:
- IDENTIFY THE SUB-DOMAIN 382B HAVING THE HIGHEST SEEDING PRIORITY VALUE 384B AMONG THE REMAINING SUB-DOMAINS
- ASSIGN A SECOND SEEDING ORDER ASSIGNMENT 381B TO THE SUB-DOMAIN 382B
- REMOVE SUB-DOMAIN 382B FROM THE SET OF SUB-DOMAINS 382

STEPS 394C - 394Z:
- REPEAT PROCESS UNTIL ALL SUB-DOMAINS 382 HAVE A SEEDING ORDER ASSIGNMENT 381

FIG. 15

DOMAIN MATRIX 318

| SUB-DOMAINS 382 | KEY 397 | SEEDING ORDER 386 | SEEDING VOLUME 398 | RESERVOIRS |
|---|---|---|---|---|
| F1 | 1,2 | 1 | 6 TO 10 | MENTOR 1, TRAINING MATERIALS |
| F2 | 1 | 2 | 3 | MENTOR 1, TRAINERS |
| F3 | 4 | 3 | 15 TO 20 | MENTORS 2-4, DATABASE 1 |
| F4 | 3,4 | 4 | 5 | MENTOR 3, UNIVERSITY 3, DATABASE 2 |
| F5 | 3 | 5 | 5 TO 6 | MENTOR 2, 3 |
| F6 | 4 | 6 | 10 TO 15 | MENTOR 3, TRAINING MATERIALS |
| F7 | 4 | 7 | 2 TO 5 | MENTORS 4, 5, DATABASE 1 |
| F8 | 1 | 8 | 2 TO 3 | MENTOR 1, DATABASE 2 |
| F9 | 1 | 9 | 3 | MENTOR 2 |
| F10 | 4 | 10 | 2 TO 5 | MENTOR 3, TRAINING MATERIALS |

TOTAL: 53 TO 75

US 6,493,697 B1

METHOD OF SELECTING DESIRED DOMAINS AND FOR DEVELOPING A SEEDING METHODOLOGY FOR A KNOWLEDGE BASE SYSTEM

RELATED APPLICATIONS

This invention relates to the following applications, filed the even date herewith, and herein incorporated by reference:

U.S. Ser. No. 09/382,057, entitled *Method and System for Development of a Knowledge Base System*, by Sharon Stier and Debra Ann Haughton (Applicant Reference No. S1/P01);

U.S. Ser. No. 09/379,687, entitled *Method and System for Monitoring Knowledge Use*, by Sharon Stier and Debra Ann Haughton (Applicant Reference No. S1/P03);

U.S. Ser. No. 09/379,694, entitled *Method and System for Use and Maintenance of a Knowledge Base System*, by Sharon Stier, Debra Ann Haughton, and Joseph Melino (Applicant Reference No. S1/P04);

U.S. Ser. No. 09/379,692, entitled *Method of Incorporating Knowledge into a Knowledge Base System*, by Sharon Stier and Debra Ann Haughton (Applicant Reference No. S1/P05).

BACKGROUND OF THE INVENTION

This invention relates generally to knowledge management systems, and particularly to the development of knowledge base systems.

One environment in which knowledge management systems are particularly useful is the computer product support industry. The computer systems on today's desktops are complicated. They involve many products (hardware and software) from many vendors. The products may or may not operate as expected when configured into a system. In addition, the user guides and references for the products are often incomplete and not always accurate. When end users have problems with their computer systems, they often need help diagnosing and then solving the problem. The computer product support industry has developed in response to that need. When a caller into a technical support organization reports a problem with a product in a certain environment, a technical support representative, sometimes known as an agent, diagnoses and attempts to solve the problem.

However, a mountain of knowledge is necessary in order to provide support for computer products. End users' answers might be found in a public document, or in a customer's or vendor's confidential information, or in a company's bank of general or confidential knowledge. In addition, through support interactions, a company generates a vast array of knowledge, particularly in areas such as product interoperability. Knowledge is always being generated because the resolution to an end user's problem may even need to pieced together from many sources of information, public and private combined.

A computer product support provider's challenge is to handle the increasing technical complexity of support delivery while keeping service quality and customer satisfaction high and costs low. Companies must establish a support infrastructure that enable them to capture, refine, and publish customer service and support information with greater efficiency through a variety of support channels. Adopting a knowledge management approach is an effective means to meet urgent customer demands.

One part of the knowledge management approach is the development and maintenance of knowledge bases as a part of a company's knowledge management system. With the proliferation of information that is needed to run businesses today, many companies are turning to knowledge base systems to store and provide access to its information. Knowledge bases provide a framework for collecting, organizing and refining the full range of information that is both collected and generated daily by a company. Knowledge bases process the new information, transforming it into actionable knowledge, present it in a consistent format, and make it readily available. They make a company increasingly effective in gathering and leveraging "institutional memory." Thus, knowledge bases provide a company with the opportunity to reuse the knowledge that it collects and creates. Such reuse is beneficial because it allows companies to use its data to conduct is business more quickly and efficiently than previously possible.

While knowledge bases provide some real benefit to companies that invest in their creation, they are expensive in time, resources and money to develop. Many complex issues must be addressed. For example, keeping in mind the work environment in which the knowledge base will operate, developers must decide the subject areas (known as domains) that would benefit from having knowledge about them incorporated into a knowledge base. They must select from which sources should the knowledge be obtained and the extent that an order in which the knowledge base should be seeded prior to activation. In addition, the developers must develop the knowledge base's architecture based on the information that it will hold and the use to which the knowledge will be put. They must develop operational processes for using the knowledge base and integrating it into with the other systems and processes used by the knowledge base user.

It is therefore an object to develop knowledge management systems that allow a company to manage the knowledge it collects and creates, make it available for use in conjunction with the other systems and processes used by the company, and monitor its use. It is a further object of this invention to develop and deploy a knowledge base so that it quickly contains a vast array of information. It is also an object to seamlessly integrate the knowledge base with the other systems and processes used by the knowledge base user, and develop operational processes for keeping the knowledge base updated.

SUMMARY OF THE INVENTION

In accordance with the present invention, there is described a method and a domain suitability indicator for selecting a desired knowledge domain for a knowledge base from a set of potential domains, the set having at least one potential domain. A domain suitability value is developed for each of the potential domains in the set. The value indicates suitability for becoming the desired domain of the potential domain for which the value was developed. The potential domain suitability values are compared and the desired domain selected from the potential domains based on the comparison.

The potential domain suitability values are developed by identifying for the set of the potential domains at least one attribute having an ability to forecast a potential benefit of selecting the potential domain to be the desired domain. For each attribute, an extent of the potential benefit is established for selected instantiations of the attribute, and an attribute valuation system is developed that demonstrates the extent of the potential benefit for each of the selected instantiations. The valuation system is developed by assigning an attribute benefit value to each of the selected instantiations, with each of the attribute values indicative of the extent of potential benefit from selecting the potential domain to be the desired domain.

For each potential domain, an actual attribute value is developed for each attribute of the potential domain by developing an actual instantiation for the domain. The actual instantiation may be identified by identifying a characteristic of the attribute, or, for an attribute that is measurable, the actual instantiation is identified by measuring the attribute. For each attribute of each potential domain, an actual attribute score is assigned, from the attribute valuation system of the attribute, with the actual attribute score based on the actual instantiation. Each of the actual attribute scores are weighted according to goals to develop the actual attribute value, and the actual attribute values for a potential domain are combined to generate the potential domain's potential domain suitability value. In the preferred embodiment, the combining comprises summing the attribute values.

In one embodiment, the attribute may be organized into sub-attributes, and an attribute valuation system developed for the sub-attributes. The sub-attributes could then be treated as attributes when evaluating the potential domains.

Once the desired domain is selected, a more specific desired domain may be selected for the knowledge base by apportioning the desired domain into a plurality of more specific potential domains. The more specific potential domains could be sub-topics of the subject matter of the desired domain, or they could be functionalities of the desired domain. A more specific potential domain suitability value is developed for each of the more specific potential domains in the second set. The more specific potential domain suitability value indicates suitability for becoming the more specific desired domain of the more specific potential domain for which the more specific potential domain suitability value was developed. The more specific potential domain suitability values are compared and the more specific desired domain is selected from the more specific potential domains based on the comparison.

In one embodiment, the method further involves recording the potential domain suitability values in a domain indicator in order to facilitate the comparison, reviewing the domain indicator to identify a potential domain having a highest potential domain suitability value; and selecting the potential domain with the largest potential domain suitability value as the desired domain.

In another embodiment, the method for selecting a desired knowledge domain may also be used to support seeding the set of potential domains into the knowledge base. The potential domains could be separate topics or they could be sub-domains of a previously selected domain for the knowledge base. The potential domain suitability value is a seeding priority value that indicates a level of importance of seeding the potential domain into the knowledge base. The process of selecting a desired domain further involves assigning a seeding order assignment to the desired domain, then removing the desired domain from the set, and, for the remaining potential domains in the set, repeating the assigning and removing steps until each of the potential domains have assigned to it the seeding order assignment.

In accordance with a further aspect of the embodiment, there is described a method for developing a seeding methodology for seeding sub-domains of a desired domain into a knowledge base, the methodology having a preferred order for seeding the knowledge base with the sub-domains. A seeding priority value for each sub-domain is determined by evaluating selected characteristics of the sub-domain. In one embodiment, comparing the seeding priority values further means ranking the sub-domains in numerical order of their associated sub-domain seeding priority values, from highest to lowest seeding priority values. In a preferred embodiment, the sub-domains are identified and their associated seeding priority values are recorded in a seeding order indicator in order to facilitate the ranking.

The method for developing a seeding methodology also involves identifying a sub-domain seeding volume to indicate an extent of the seeding of each sub-domain prior to activation of the knowledge base. The volume is an estimate of the number of records to be entered into the knowledge base in order to capture the knowledge about the sub-domain. The method also involves identifying a domain seeding volume for the domain that is calculated by totaling the sub-domain seeding volumes for each of the sub-domains.

Once the seeding methodology is developed, it is represented in a domain matrix which details the preferred order for seeding and seeding information, such as the sub-domain seeding volume, for each of the sub-domains. Seeding information is also an identification of an extent of knowledge available about each of the sub-domains and an identification of knowledge reservoirs for each of the sub-domains.

BRIEF DESCRIPTION OF THE DRAWINGS

The above-mentioned and other features of the invention will become more apparent by reference to the following description taken in connection with the accompanying drawings in which:

FIG. 1b is a block diagram of the knowledge base memory 35 show in FIG. 1a;

FIG. 2 is block diagram view of a knowledge management system 50 for developing and maintaining the knowledge base system 10 shown in FIG. 1a;

FIG. 5 is a diagrammatic view of the summary 205 of the results of the baseline analysis 202 of FIG. 2 for the preferred embodiment;

FIG. 10 is a representation of a knowledge domain indicator 316 shown in FIG. 6;

FIG. 14a is a block diagram of the process for developing a seeding methodology;

FIG. 14b is a block diagram of step 394 shown in FIG. 14a;

FIG. 15 is an illustrative example of a domain matrix 318; and

FIG. 16 is a block diagram view of the workflow system 470 shown in FIG. 1a.

DESCRIPTION OF THE PREFERRED EMBODIMENTS

General

The preferred embodiment for this invention is a knowledge base that has been developed for use in the technical support environment. Such systems provide knowledge about hardware, software, the environments in which they are used, and any customer-specific support requirements, such as specific workflow or scripts to follow. A knowledge management system can be used to collect and process that data, and present it in a consistent fashion in a knowledge base, which can assist the agent in identifying a likely cause of the problem and resolution.

Figure 1A:
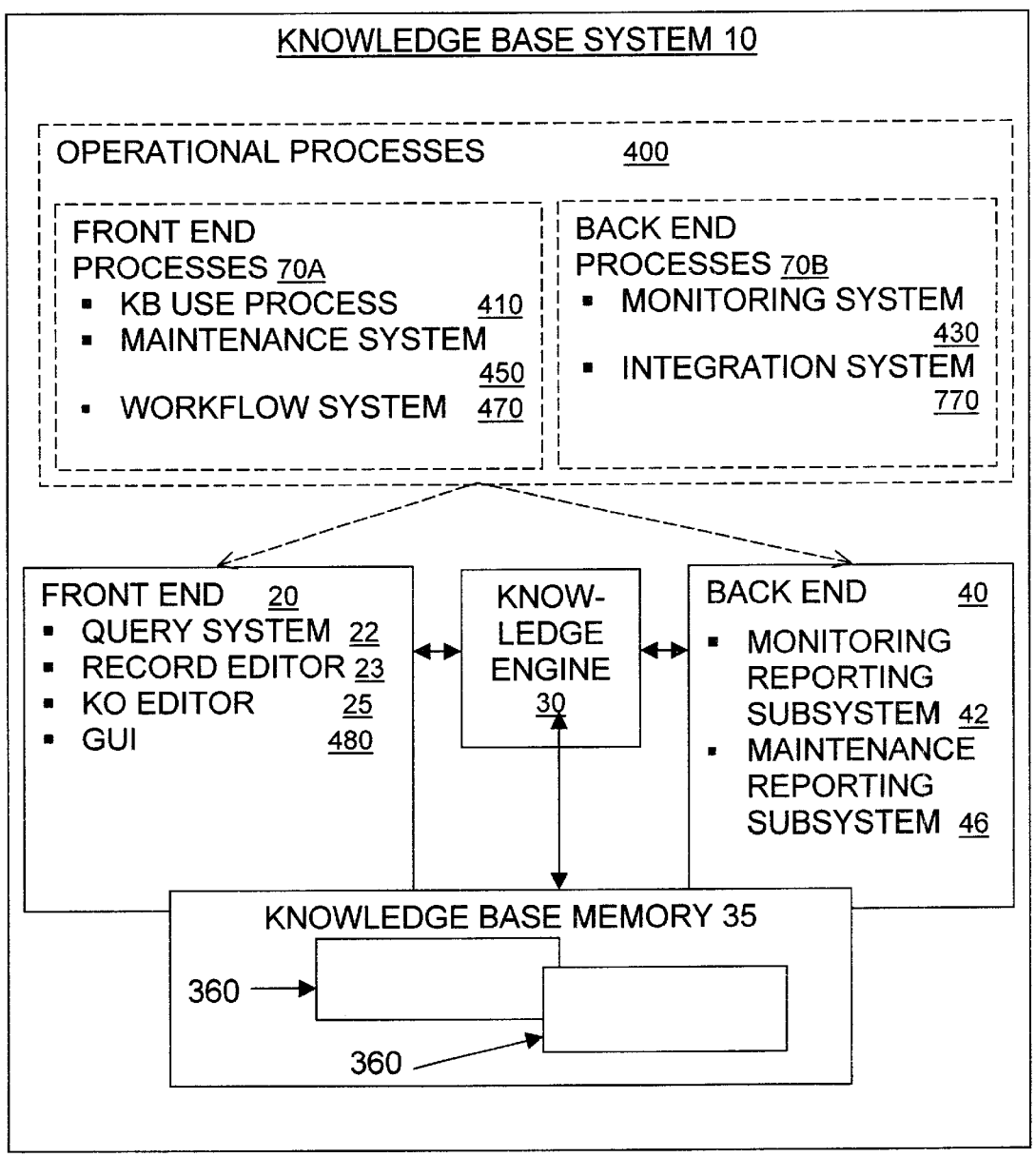
FIG. 1a is a block diagram view of a knowledge base system of the preferred embodiment.

FIG. 1a shows a knowledge base system 10 having a knowledge engine 30, a knowledge base memory 35, a front end 20 for accessing the engine 30 and memory 35, and a back end 40 consisting of metrics and reporting for testing and modifying the knowledge base system 10 and for providing customer feedback. Coupled to the knowledge engine 30 is a knowledge base memory 35. The front end 20 has a query system 22 for submitting queries to the knowledge engine 30, a record editor 23 for entering and editing records in the knowledge base memory 35, a knowledge object editor 25 for entering and editing records in the knowledge base memory 35, and a graphics users interface (GUI) 480 to allow access to the query system 22 and the editors 23, 25. The back end 40 has a knowledge monitoring reporting subsystem 42 and a knowledge maintenance reporting subsystem 46 to provide reports of knowledge base use activity.

In the preferred embodiment, the knowledge engine 30 is a cognitive processor such as the KnowledgeBridge™ processor available from ServiceWare, Inc. of Oakmont, Pa. The knowledge base system 10 is optimized for the KnowledgeBridge™ architecture, which implements a concept-association model of knowledge storage and retrieval using neural net, fuzzy logic, and advanced natural language technology. However, front and back ends 20, 40 are relatively independent of the knowledge engine 30, so that they could be used with virtually any knowledge providing system, such as, for example, a case-based reasoning system.

Figure 16:
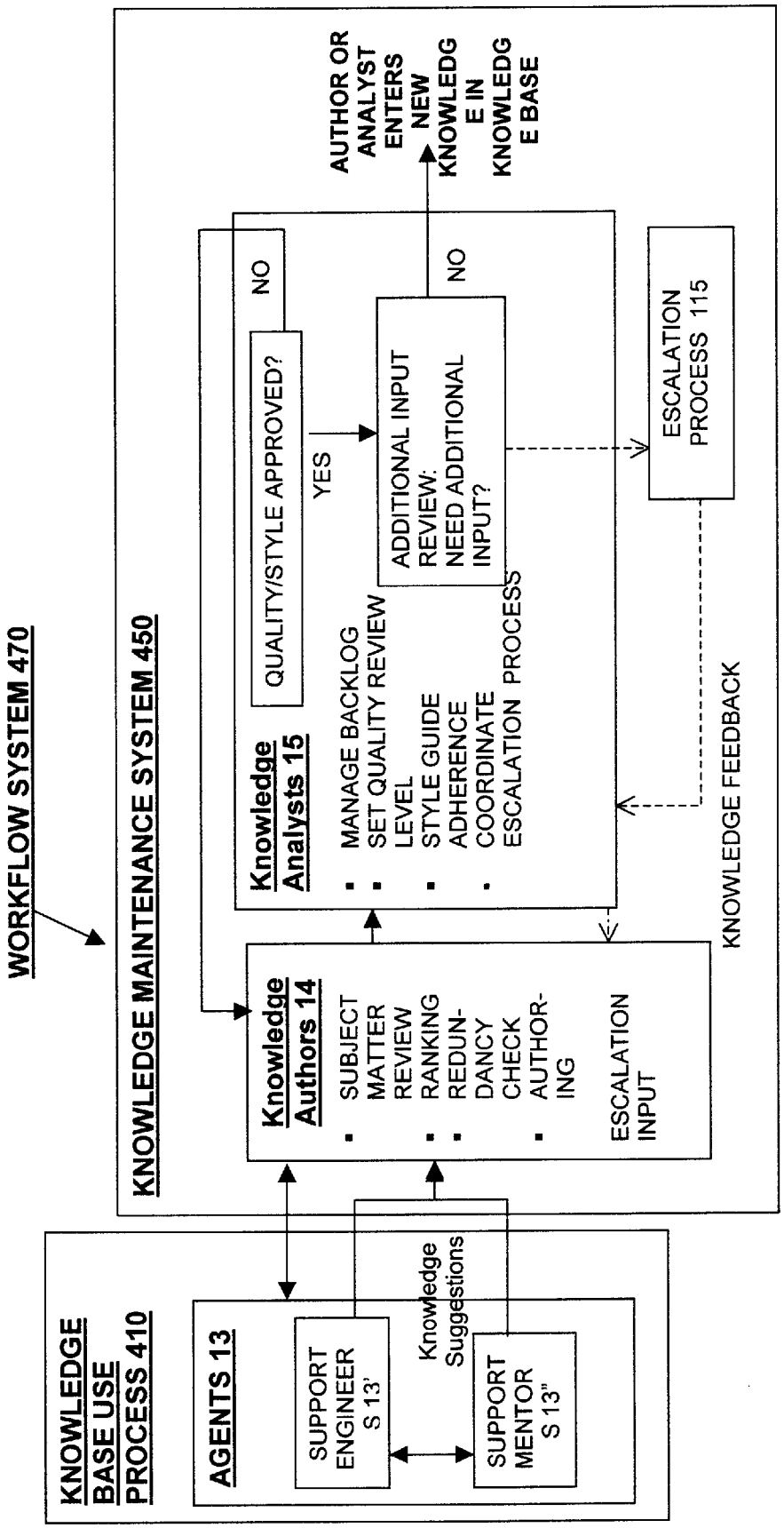

In the preferred embodiment, the knowledge base system 10 is developed and maintained through a knowledge management system 50 shown in FIG. 2. The knowledge management system 50 that comprises a methodology to define and develop the knowledge base system 10 and to collect, organize, refine, publish and reuse information in the knowledge base system 10. The knowledge management system 50 also comprises supporting business processes and methodologies to keep the knowledge base updated, to integrate the knowledge base with the other systems and processes used by a user of the knowledge base, and to monitor use of the knowledge. As shown in FIG. 16, a knowledge analyst 15 has overall responsibility for the knowledge base and knowledge authors 14 populate the knowledge base and then keep it updated using an innovative authoring methodology involving objectifying the knowledge.

Multi-phase Process 60

General

The knowledge base management system 50 of the preferred embodiment provides for a targeted, easily used, easily maintained knowledge base system 10. As shown in FIG. 2, its methodology to define and develop the knowledge base system 10 and to collect, organize, refine, publish and reuse information in the knowledge base system 10 involves a multi-phase process 60. First, in a baseline analysis phase 200, a baseline analysis 202 is conducted to determine the scope of developing the knowledge base, define knowledge base development approach and plan, and define a knowledge engineering direction. Recognizing that developing and operating a knowledge base has many aspects, the baseline analysis 202 involves surveying at least one of the aspects and developing aspect results 204, also known as survey results 204, and complexity indicators 220 for the surveyed aspects. Indicators 220 are combined to give an overall complexity indicator 220' for the development and operation of the knowledge base. Once the baseline analysis phase 200 is completed, an in-depth analysis phase 300 involves conducting an in-depth analysis 302 with an input being the aspect results 204 from the surveying of aspects of the development during the base-line analysis 202. The in-depth analysis 302 involves conducting a domain analysis 310 to identify a desired domain for the knowledge base, a reservoir analysis 330 to identify and analyze the quality of the sources of knowledge for the domain, and a vector analysis 340 to define a structure for the knowledge base. The in-depth analysis 302 has as outputs a construction and seeding plan 350 for the knowledge base and specifications 370 for operational processes for use of the knowledge base.

In the development phase 500, knowledge base development 502 involves constructing and seeding the knowledge base system 10 in accordance with the construction and seeding plan 350, preparing the knowledge base system 10 for deployment. The construction and seeding of the knowledge base system 10 involves adding content to the knowledge base memory 35. The operational processes are developed in accordance with the specifications 370 drawn up in the in-depth analysis phase 300. Also developed is the deployment plan 520 for deployment of the knowledge base. In the deployment phase 700, deployment 702 of the knowledge base system 10 occurs in accordance with the deployment plan 520. The knowledge base system 10 is used to answer end-user queries. The processes that were developed during the development phase 500 are used to monitor operations and to provide for continuous improvement of the knowledge base system 10.

Baseline Analysis Phase 200

General

The baseline analysis 202 is performed by the Knowledge Engineer or the Implementation Manager assigned to the development. It gives an indication of the scope of effort required to implement and operate the knowledge base on a support team through a determination of operational procedures, agent demographics, and the complexity of the support domains. The baseline analysis 202 is conducted to gain a general understanding of the scope of developing the knowledge base. It involves analyzing the various aspects of the development, such as makeup of the team, the relationship with the vendor, work flow, system tools used by the agents, and the supported domains. It is used as a starting point for all further knowledge base implementation activities.

Aspects 210

General

Figure 3:
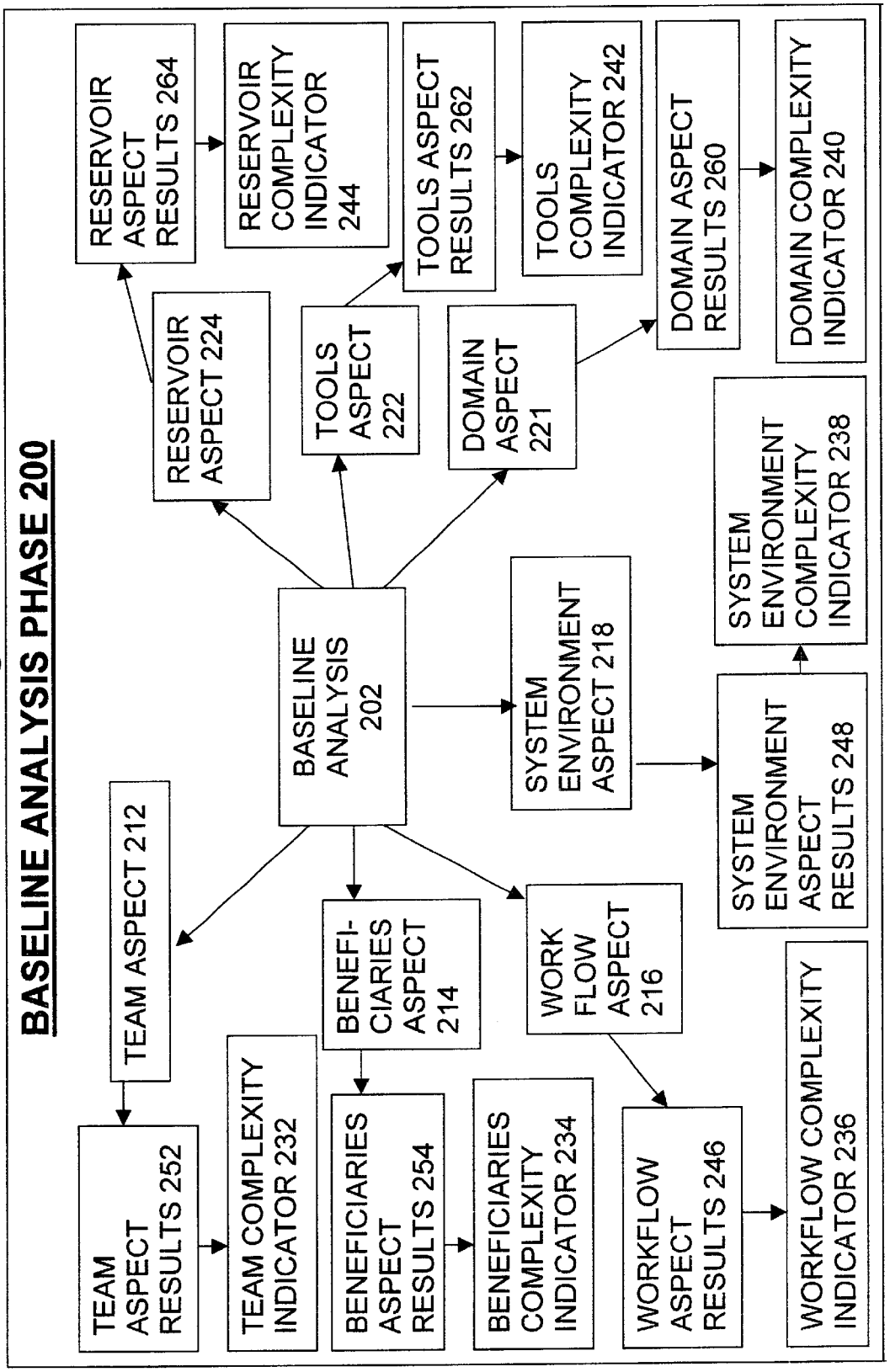
FIG. 3 is a block diagram view of the baseline analysis 202 shown in FIG. 2.

In the baseline analysis 202 shown in FIG. 2 and FIG. 3, aspects 210 of the knowledge base development are surveyed, and aspect results 204 are obtained. The surveying can take the form of any appropriate data collection mechanism, such as conducting focus groups, analyzing metrics, call coaching, or conducting surveys or interviews of the intended beneficiaries and users of the proposed knowledge base system 10. The aspect results 204 suggest the direction to be taken in areas such as domain selection, knowledge base architecture, and development methodology, and it facilitates the actual later development of these areas. Second, the aspect results 204 suggest the impact that that the surveyed aspects 210 will have on the complexity of the knowledge base development. In the preferred embodiment, the baseline surveying involves identifying and evaluating the complexity of the aspects 210. Complexity indicators 220 are developed for each of them, and then combined to give an overall complexity indicator 220' for the development of the knowledge base.

Aspects 210 that may be considered in the base line analysis include the following. The team aspect 212 involves the composition of a support team for developing, using and maintaining the knowledge base system 10. The beneficiaries aspect 214 involves the potential beneficiaries of the knowledge base system 10. The workflow aspect 216 involves the workflow between systems and processes with which the knowledge base system 10 is expected to interact or co-exist. The system environment aspect 218 involves the system environment, including hardware, software, and network in which the knowledge base system 10 will operate. The domains aspect 220 involves the potential domains for the knowledge base. The tools aspect 222 involves the tools available to track metrics. The reservoir aspect 226 involves the potential reservoirs from which information may be obtained to seed the knowledge base.

Team Aspect 212

Figure 6:
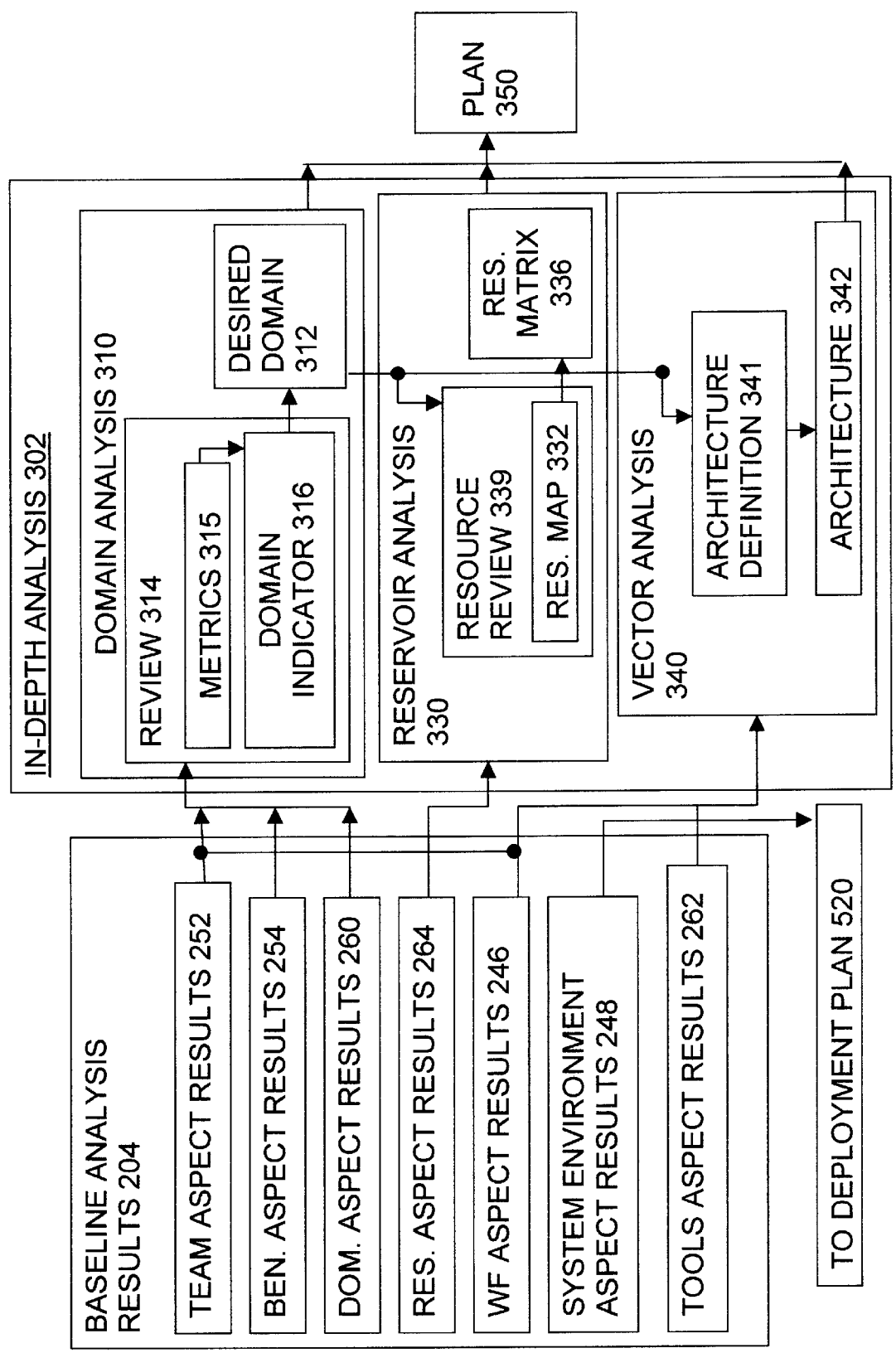
FIG. 6 is a block diagram of the aspect results 204 and in-depth analysis 302 shown in FIG. 2.

The base-line analysis of the team aspect 212 identifies, evaluates the complexity of, and develops a team complexity indicator 232 for the support team. As shown in FIG. 6, the team aspect results 252 will be used as input into the domain analysis 310. The team aspect results 252 involve an identification and evaluation of the complexity presented by features of the team, including current number of technicians on the team and the number of products supported by each technician. Other features that affect the complexity include any plans to reduce or increase staff, ratio of technicians to mentors, and the extent of the knowledge gap between new and experienced technicians.

Identifying the knowledge gap, or the difference in knowledge held by a novice and a fully trained average technician, will suggest how useful a knowledge base will be, because the bigger the knowledge gap, the more opportunity for a knowledge base to help the less experienced technician. Knowledge gap is developed by reviewing agent performance metrics and quality metrics, sorted by experience level.

Agent performance metrics include Average Handle Time, Training Time, and Ramp Time. AHT, described in more detail below, is the average time spent on a transaction. Training Time is the average number of days that an agent takes in product training specific to a new product or new release. It may or may not include time spent in tools training. Ramp Time is the average number of weeks that it takes for a new agent to reach average performance rates, derived by looking at engineer statistics for customer satisfaction, escalation rate, first call resolution and average handle time.

Quality metrics include the First time Fix (FTF) rate, Escalation rate, and Customer Satisfaction. FTF rate is the frequency that problems are resolved on a first call for technical support. Call escalation rate is the percentage of transactions that are escalated for assistance. Customer Satisfaction is an indicator that the customer believes measures end-user satisfaction with the support provided. Quality metrics are described in detail below.

Identifying the team's turnover rate and average length of service is a factor in determining to which support group the knowledge base system 10 should be targeted. For example, if turnover is high and average length of service is short, the team will have a higher percentage of less experienced technicians, who would benefit from a knowledge base focused on simpler, more fundamental aspects of the knowledge.

Factors in developing the team complexity indicator 232 provided by the support team include initial and ongoing training. Identifying how long is the team training and what is included in and missing from training is a good indication of the complexity of the potential domains for the knowledge base, and what is a good potential seed domain.

Identifying the existing reward systems for creating and using knowledge will indicate the complexity of the cultural changes required to gain the team's cooperation in keeping the knowledge base updated once it is deployed. The success of updating will depend on the extent that users will capture knowledge created during use of the knowledge base. If the team is currently rewarded for creating knowledge either by its management or the customer whose products they support, implementing the cultural changes to capture knowledge will be easier.

Also adding to the team complexity indicator 232 might be the current workload of subject matter experts who are candidates for authoring the records of the knowledge base. If they are so busy in their current jobs that their availability is limited or non-existent, knowledge base construction becomes extremely difficult.

Beneficiaries Aspect 214

The base-line analysis of the beneficiaries aspect 214 identifies, evaluates the complexity of, and develops a beneficiaries complexity indicator 234 for potential beneficiaries of the knowledge base system 10. As shown in FIG. 6, the beneficiaries aspect results 254 will be used as input into the domain analysis 310. In the preferred embodiment, the beneficiaries aspect results 254 are an identification and evaluation of the complexity presented by features of the potential beneficiaries. In the preferred embodiment, beneficiaries are the company developing the knowledge base system 10 to assist its employees in providing support, its customer whose products will be supported with the knowledge base system 10, and the customer's end users whose support requests will be answered with the knowledge base.

Any information unique to any beneficiary that could impact chosen domains or the overall program should be identified because they could add to the beneficiaries complexity indicator 234. Actual identification of all of the beneficiaries, their goals for the program, a list of supported products, including any problem areas metrics, and any market conditions that might affect the domain chosen or the knowledge base program itself will help determine domain selection and metrics and methodology. In addition, operational issues such as a high turnover rate or high escalation rates, described below, the desired timing of implementation, and result metrics should be identified.

Workflow Aspect 216

The base-line analysis of the workflow aspect 216 identifies, evaluates the complexity of, and develops a workflow complexity indicator 236 for the existing workflow of the target users of the knowledge base system 10. The workflow aspect results 246 are an identification and evaluation of the complexity of the workflow between systems and processes with which the knowledge base system 10 is expected to interact or co-exist. As shown in FIG. 6, the workflow aspect results 246 will be used as input into the vector analysis 340. In the preferred embodiment, the existing workflow includes the entire technical support procedure from the initiation of a request for support to final resolution. Workflow includes not only the steps followed by the user in resolving a call but also the user's call queue and call routing structures, including the call escalation procedure and the rate of occurrence of call escalation. The call escalation rate is particularly important because it can identify the potential for improvement of a user's performance by addition of a knowledge base to the user's tools.

Other factors affecting the workflow complexity indicator 236 are the number, type and complexity of the call services provided by the user. The more complex the support expected to be provided, the more complex the knowledge base, maintenance system, and user interface will have to be. In addition, the stability of the workflow and the call routing structure affects the complexity of knowledge base development and maintenance; if they are not static, there will be impacts in knowledge base design time, update-ability, and accuracy. Because of their impact on the development, any plans in general to change the current workflow or the call routing structure should be identified.

System Environment Aspect 218

The base-line analysis of the system environment aspect 218 identifies, evaluates the complexity of, and develops a system environment complexity indicator 238 for the existing and planned system environment. As shown in FIG. 6, the system environment aspect results 248 will be used as input into the development of the deployment plan 520. They are an identification and evaluation of the complexity presented by features of the system environment, including the typical desktop configurations and expected desktop requirements (and incompatibilities between then). Other features are the tools currently available to track metrics (and their suitability for use with the projected knowledge base), and technical architecture configuration options.

Also to be identified and evaluated for its impact on the system environment complexity indicator 238 are any required linkages to systems to which the knowledge base system will be interfaced. In the preferred embodiment involving technical support of products, the systems environment requires linkages to Internet capabilities such as email, chat rooms, and call tracking and call routing system for managing the support function. The system may also involve a knowledge base owned by the customer whose products are being supported. The implementation and maintenance of the knowledge base will be more complex if the customer is planning to continue to maintain its knowledge base when the proposed knowledge base is deployed. Bilateral knowledge exchange will need to occur if both systems are to remain updated.

If the knowledge base developer has used and maintained an external system to which it will be required to link the knowledge base (even if the prior use was not in a knowledge base environment), integration with the projected knowledge base will be easier. If it has no experience with the system with which it is expected to link the knowledge base, integration will be more complicated. Finally, planned systems upgrades should be identified, because they could complicate the timing of the integration development.

Domain Aspect 221

The baseline analysis of the domain aspect 221 identifies, evaluates the complexity of, and develops a domain complexity indicator 240 for potential domains for the knowledge base system 10. The domain aspect results 260 are an identification and evaluation of the complexity presented by features of the of the domains which have a high potential for realizing benefits against the goals of the implementation of the knowledge base. The desirability of incorporating a potential domain into a knowledge base is suggested by current and expected levels of activity for the domain. As shown in FIG. 6, the domain aspect results 260 will be used as input into the domain analysis 310.

Factors in developing the domain complexity indicator 240 include whether the supported domains are themselves of complex subject matter. If they are, the knowledge base will be more useful but the seeding and knowledge base construction and maintenance will be more difficult. Another factor to consider is the measurability of the potential domain. The surveying will involve analyzing each of the potential domains with potential domain indicators, such as percentage of queue, measurability, average handle time, and rate of first time fix for each of the potential domains. They are all described below.

If a preponderance of general knowledge is already available in the knowledge base or if the customer wants the seed domain to be an unreleased product with no support history, seeding and knowledge base construction will be simpler. When domains are being added to an already deployed knowledge base, thus supplementing an already existing knowledge base, authoring processes and maintenance process already be in place. Therefore, seeding and knowledge base construction will be made simpler. Construction and seeding may be also simplified if aspects or portions of the potential domain are already within the knowledge base to handle portions of the potential domain. If so, consideration would be given to the best way to utilize the already present knowledge to facilitate seed construction for the rest of the domain.

Tools Aspect 222

The base-line analysis of the tools aspect 222 identifies, evaluates the complexity of, and develops a tools complexity indicator 242 for the tools necessary to conduct a quantitative analysis of the potential domain. The domain analysis conducted later in the in-depth analysis will involve a quantitative review of the potential domain. Information will be needed to analyze attributes of the potential domain such as number, type and resolution of calls, escalations, etc.

The tools aspect results 262 are an identification and evaluation of the complexity of the tools necessary to obtain domain statistics, such as Percentage of Queue, First Time Fix (FTF) rate, measurability, and Average Handle Time (AHT). These statistics are described detail in connection with the description of the domain analysis 310. In addition, management of the deployed knowledge base will involve ongoing scrutiny of metrics. If necessary metrics are unavailable, tools will have to be developed to track them, adding to the complexity of the development, and thus increasing the value of the tools complexity indicator 242. As shown in FIG. 6, the tools aspect results 262 will be used as input into the development of the deployment plan 520.

Reservoir Aspect 224

The base-line analysis of the reservoir aspect 224 identifies, evaluates the complexity of, and develops a reservoir complexity indicator 244 for all potential reservoirs from which information may be obtained to seed the knowledge base. As shown in FIG. 6, the reservoir aspect results 264 will be used as input into the reservoir analysis 330. The reservoir aspect results 264 involve identifying and evaluating the complexity presented by features of the potential reservoirs. Such features include factors such as how much data is available for the seed domain, and how complicated will be the task of populating the desired knowledge bases from the sources.

A reservoir map 332 is developed to show all potential reservoirs. Potential reservoirs include all informational sources such as traditional users' guides, books, mentor call logs, team newsletters, customer data and knowledge bases. They should be evaluated for accessibility, readability, comprehensiveness, and ease of incorporation into the proposed knowledge base. For example, if information must be pieced together from many sources, populating and maintaining the knowledge base will be more complex than if the knowledge can be obtained from one or only a few sources. In addition, although customer knowledge may be available to populate the knowledge base, its format may require manual conversion, which would be more difficult than automatic conversion.

Another factor affecting the reservoir complexity indicator 244 is the relationship of each reservoir to analysts/mentors in terms of the knowledge flow. Factors such as whether the knowledge source is periodically updated, possibly aging, or whether the source contains information whose use is restricted because of licensing or confidentiality obligations or other reasons will affect the complexity or seeding and maintenance.

Other Aspects

Other aspects could be used in conducting the base-line analysis. For example, a measure of Customer Satisfaction is an indicator that the customer believes measures end-user satisfaction with the support provided. Measurement and acceptable levels of customer satisfaction would vary by customer. Sample metrics include survey results, random call monitoring, and a customer satisfaction index, which differs from client to client and may be subjective or objective. A low measure of customer satisfaction indicates high potential for improvement in customer satisfaction by implementation of a knowledge base.

High and Low Level Analyses

Figure 4:
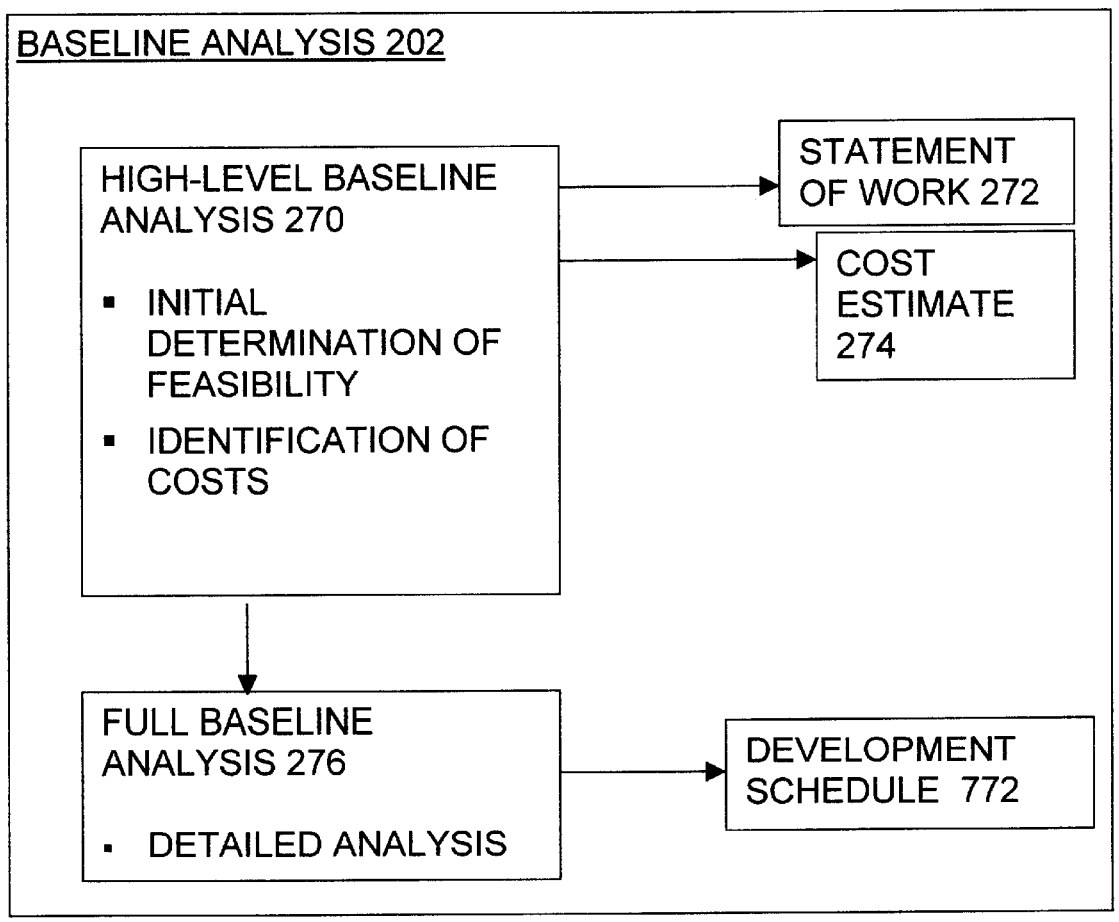
FIG. 4 is a block diagram of the bi-level baseline analysis 202 of the preferred embodiment.

Referring to FIG. 4, in the preferred embodiment, the baseline analysis 202 is conducted in two parts. First a high-level baseline analysis 270 of the above-identified aspects of the development provides an initial determination of the feasibility of the knowledge base development and projects a cost. If the high-level analysis 270 indicates that the knowledge base construction is feasible, a full baseline analysis 276 is conducted. The goal of the full baseline analysis 276 is to understand in depth each aspect of the development.

The full baseline analysis 276, which is a detailed analysis of each aspect of the development. If certain metrics were estimated in the high-level baseline analysis 270, they are calculated completely in the full baseline analysis 276. For example, Average Handle Time (AHT) is one of the metrics examined while analyzing the team aspect 212. In the high-level baseline analysis 270, AHT is developed from survey results. Agents are asked to estimate the time spent on resolving a problem, by potential domain. They are provided with an average amount of time for resolving a problem in the potential domain under consideration. They are then asked to estimate whether they resolve a problem below the average amount of time, in the average amount of time, or above the average amount of time. In the full baseline analysis 276, the exact AHT is developed from the data collected by the call tracking system 402.

The output of the high-level baseline analysis 270 is a statement of work 272 and a cost estimate 274. The output of the full analysis is a development schedule 772. The statement of work 272 includes a definition of scope, a description of expected deliverables, resources assignment, a high level outline of a schedule, and the expected level of effort for each surveyed aspect. Expected level of effort is demonstrated with a complexity indicator 220, one of which is developed for each aspect. The complexity indicator 220 may be any appropriate indication of complexity. In the preferred embodiment, a complexity indicator 220 consists of an assessment of high, medium and low complexity of the aspect. FIG. 5 is a baseline analysis summary 205 of the baseline analysis 202.

While conducting the baseline analysis, it is helpful to document as much information as possible to facilitate future phases of the knowledge base development. For example, when surveying the beneficiaries aspect, the customer contacts that would be stakeholders in the program are identified. Creating a chart of them will facilitate future customer communication.

In-depth Analysis Phase 300

General

The in-depth analysis phase 300 is conducted to develop a construction and seeding plan 350 for the proposed knowledge base system 10. It is also conducted to develop specifications 370 for operational processes for use of the knowledge base, for monitoring knowledge base operations, and for maintenance of the knowledge base system 10. Inputs to the in-depth analysis phase 300 are the aspect results 204 from the surveying conducted during the baseline analysis phase 200.

Construction and Seeding Plan 350 Development

General

Returning to FIG. 2 and referring to FIG. 6, the construction and seeding plan 350 for the proposed knowledge base is the output of three analyses conducted in the in-depth analysis phase 300. A domain analysis 310 is conducted to identify a desired seed domain 312 for the knowledge base. The desired domain 312 is the output of the domain analysis. A reservoir analysis 330 is developed to identify and analyze the quality of the sources of knowledge for the domain; a reservoir map 332 is its output. A vector analysis 340 is conducted to define a structure for the knowledge base; a knowledge base architecture 342 is the output of the vector analysis 340. The construction and seeding plan 350 is created for the selected domain, knowledge sources and knowledge base structure, using the desired domain 312, the reservoir map 332, and the architecture 342 as inputs.

Domain Analysis 310

General

The system for selecting a desired domain involves conducting an in-depth domain analysis review 314 of potential domains. A domain indicator 316 is developed for the potential domains to indicate a preferred candidate for the desired domain 312 among the potential domains. Inputs to the domain analysis review 314 include the baseline analysis survey aspect results 204, particularly the domain aspect results 260, the team aspect results 252, and the beneficiaries aspect results 254.

Figure 7:
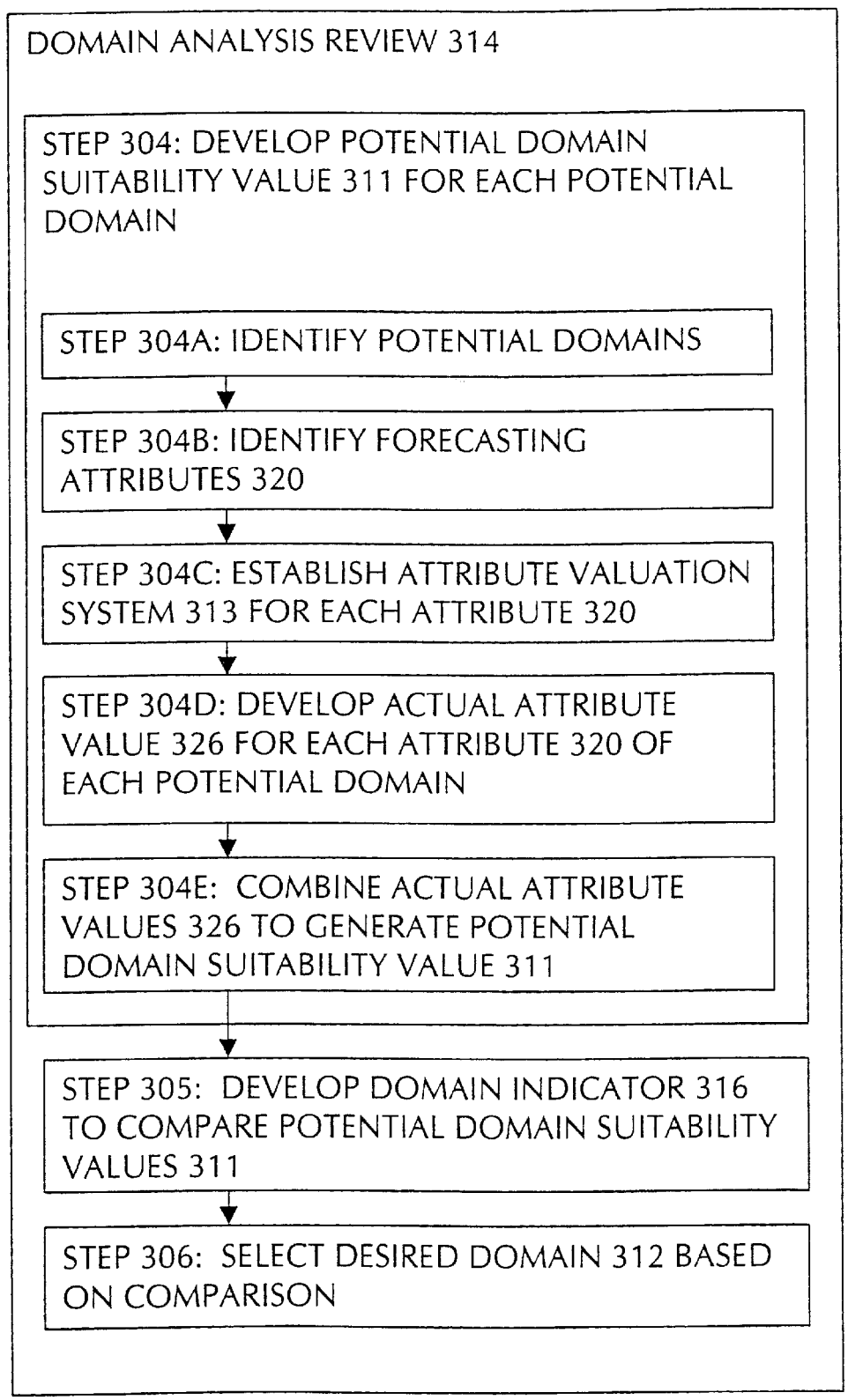
FIG. 7 is a block diagram of the domain analysis review 314 shown in FIG. 6.

FIG. 7 is a diagrammatic representation of the process conducted in the domain analysis 310 to select a desired domain 312. As shown in FIG. 7, the domain analysis review 314 starts with step 304, in which a potential domain suitability value 311 is developed for a set of potential domains. In step 305, a domain indicator 316 is developed to assist in comparing the potential domain suitability values 311; and in step 306, a desired domain 312 is selected based on the comparison of potential domain suitability values 311.

The potential domain suitability values 311 are developed in step 304 by steps 304a through 304e. In step 304a, the potential domains are identified. In step 304b, at least one attribute 320 having an ability to forecast a potential benefit of selecting the potential domain to be the desired domain 312 is developed for the set of the potential domains. In step 304c, for each attribute 320, an attribute valuation system 313 is developed that demonstrates the extent of the potential benefit for each of a selected set of potential instantiations. In step 304d, an actual attribute value 326 is developed for each attribute 320 of each potential domain. In step 304e, the actual attribute values 326 for a potential domain are combined to generate the potential domain's potential domain suitability value 311. In the preferred embodiment, the combining comprises summing the actual attribute values 326.

Potential Domain Selection

Returning to step 304a, identifying potential domains for the technical support environment of the preferred embodiment involves choosing between product and functional areas within principal applications. The goal is to use a seed domain that has a high potential for realizing benefit against the goals of the implementation. In the context of a knowledge base system 10 to support technical support services, this would be achieved by finding a desired domain 312 which generates a large amount of support requests that are often escalated to more experienced staff. In this manner, the knowledge base construction is targeted at a manageable subject area, with which first level agents confidently could address many of the calls (for example, 80%) for the subject area, thus reducing handle time and escalations.

A desired domain 312 has enough activity to allow agents to become familiar with the knowledge base system 10 and build enough metrics for benefit analysis and realization. In the technical support environment of the preferred embodiment, examples of potential domains to be evaluated for selection as the desired seed domain include Interaction with External Applications, Installation, Configuration, Macros, and Printing.

Potential domains for knowledge bases that support technical support services are identified by analyzing call tracking reports and support team surveys, which will identify high-incident support subject areas. Call tracking reports supply information regarding calls for support, and through interfaces with the agent providing support, information about the domain at issue, the questions asked, and the support requested during the call can be input and tracked. The sample of call tracking reports used in the analysis preferably should be random, with data extracted across a time period of several months. In that way, the sample captures and represents call center changes such as call center spikes, turn over, and new releases or products.

Conducting focus groups of selected team members and clients is essential to determining the areas in which and functions for which additional tools might benefit the quality of the support provided by the team. In focus groups, a mixture of experience levels will provide different perspectives on the issues facing the support group.

Surveying selected members of the team and interviewing the technicians and mentors is helpful in finding out about the issues that technicians believe they address on a day-to-day basis. Surveying also uncovers the amount of research that goes into resolving different kinds of problems. It is also helpful to make notes of the resources that technicians use to provide support. The technicians' answers should be kept separate from the mentors or technician experts, because their levels of understanding of the technology and ability to provide support are so different. Survey results would be skewed if they were tabulated together. Observing the technical support technicians and mentors during live support calls is helpful in identifying domains that could support the technicians. In addition, listening to the calls that the technicians receive will assist in developing an understanding of the types of situations that they face and how they respond, and therefore helps to identify domains that could support the technicians.

It is also preferable to start with a domain that can be measured. Automated call distribution (ACD) reports and call tracking reports supply information on measurability of domains. ACD reports also supply information on statistics for potential domains such as call volume, which is the actual volume of calls that come into a call center in a given period of time, and Average Handle Time (AHT). AHT is the average time spent on a transaction, which is an individual instance of contact for support. Sometimes AHT is called the average call length. It does not include queue time, which is the amount of time that a caller waits on hold until an agent can take the call. Depending on the preferences of the customer whose products are being supported, AHT may or may not include wrap time, which is the amount of time that an agent uses to perform the administrative tasks associated with the request for support. Therefore, AHT is calculated to be the average number of minutes from the time a call is picked up until the time it ends. Alternatively, it is the average number of minutes from the time a call is picked up until the time it ends minus wrap time.

Additional inputs include calculating and reviewing metrics such as the knowledge gap, new product rate, call escalation rate, and non-answered questions rate. Knowledge gap is the difference in knowledge help by a novice and a fully trained average technician. New product rate, the frequency with which a product is revised, demonstrates a product's likely longevity and maintainability. A product that is likely to have a long shelf life is a better candidate for a knowledge base than one with a short shelf life.

Call escalation rate is the percentage of transactions that are escalated for assistance (to mentor, to customer or to third party), compared to the total number of transactions. Escalation rates are effective in showing what domains are having problems and can benefit the most by deployment of a knowledge base. Escalation rates can be derived from sources such as client reports or, as discussed below, from technician surveys. Non-answered questions rate is the frequency that question are unanswered about a domain. A domain with a high unanswered question rate is another excellent candidate, because well formatted, easily accessible knowledge may reduce the number of unanswered questions.

Potential Domain Suitability Values 311

Attributes 320

Once the set of potential domains is identified, forecasting attributes 320 are identified in step 304b. In the preferred embodiment, the potential domain attributes 320 that are evaluated include but are not limited to a query frequency attribute 320a that is the frequency of queries involving the potential domain, which in the context of technical support is the frequency of calls concerning the potential domain; a first time fix attribute 320b that is the frequency that problems in the potential domain are resolved in a first request for technical support; an escalation attribute 320c that is the frequency that problems involving the potential domain are forwarded for assistance in resolution; a knowledge gap attribute 320d that is the difference between a new agent and an experienced agent in ability to resolve a problem in the potential domain; a measurability attribute 320e that is the ability of the potential domain to be measured (that is, to generate metrics for benefit analysis and realization); a training attribute 320f that is the training that a team receives for a potential domain; a repetition attribute 320g that is the frequency of a problem being repeated in a potential domain; and a leverageability attribute 320h that is the ability of knowledge about a potential domain to provide benefit outside of the potential domain.

Other attributes may also be used in developing the domain indicator. For example, a measure of Customer Satisfaction may be used because a low measure of customer satisfaction for a domain indicates high potential for improvement in customer satisfaction by implementation of a knowledge base in the domain.

When the forecasting attributes 320 are identified, a valuation system 313 is developed in step 304c for each of the attributes 320. Each of the attributes 320 is reviewed to select a set of potential instantiations of the attribute 320. Instantiation may be identified by identifying a characteristic of the attribute, or, for an attribute that is measurable, the potential instantiation is identified by a potential measurement of the attribute. For each selected potential instantiation, the attribute 320 is assigned an attribute benefit value 323 that demonstrates the extent of the potential benefit of selecting the target potential domain to be the desired domain 312, as demonstrated by the attribute 320 in its selected potential instantiation. From the attribute values 323, an attribute valuation system 313 is developed for each attribute 320.

Attribute Valuation Systems 313
General

Figure 9:
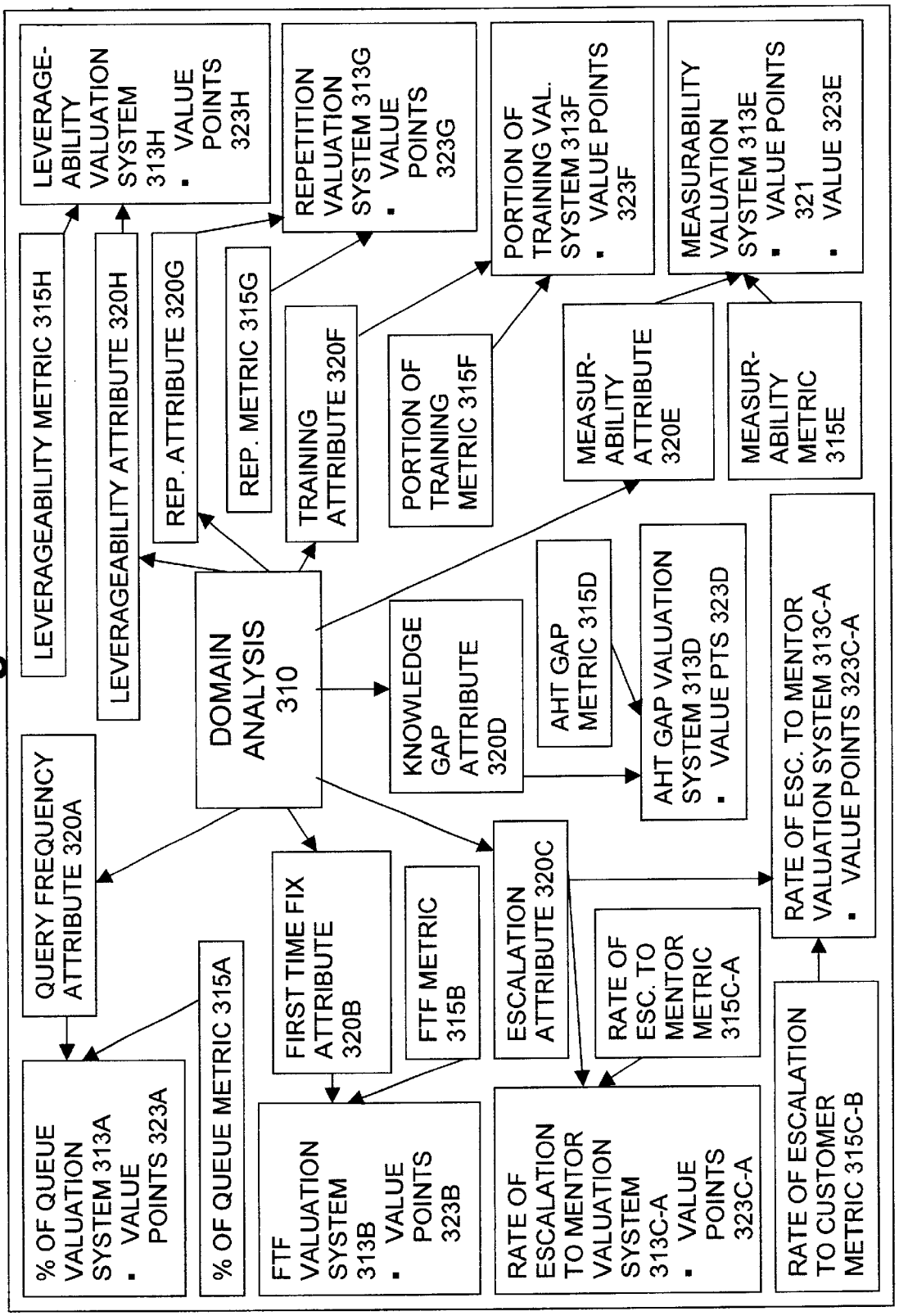
FIG. 9 is a block diagram of the domain analysis 310 shown in FIG. 6.

The attributes 320 of the preferred embodiment are measured by metrics 315 described below. Attribute benefit values 323, also known as value points 323, are assigned to the metrics 315 for an attribute 320 to reflect quantitatively the extent of the potential benefit that a potential domain would provide to a knowledge base, if the potential benefit was demonstrated by the attribute's metric. FIG. 9 shows in diagrammatic form the domain analysis 310 shown in FIG. 6. A survey may be used to collect data for assigning value points 323. However, the survey results alone may not provide the complete answer so survey results could be combined with focus group discussion in order to achieve a more realistic point disbursement. A focus group may consist of a combination of mentors, lead technicians, mentors in training and possibly newer technicians.

Query Frequency Attribute 320a

The query frequency attribute 320a, the frequency of queries involving the potential domain, is measured by the Percentage of Queue metric 315a, which is the percentage of calls concerning the potential domain, compared to all calls for the support team. The Percentage of Queue valuation system 313a follows:

| Percentage of queue valuation system 313a | |
| --- | --- |
| Points 323a | Description of Metric 315a |
| 0 | Domain is less than 10% of agent's calls |
| 2 | Domain is 10–20% of agent's calls |
| 4 | Domain is 20–30% of agent's calls |
| 2 | Domain is 30–40% of agent's calls |
| 0 | Domain is over 40% of agent's calls |

A Percentage of Queue metric 315a of 20–30% indicates a useful seed domain because questions about the domain take up a high enough percentage of the calls into the team to encourage use of the knowledge base but they do not take up such a big proportion of the calls that the knowledge base requires an inordinate amount of seed cases. Of course, the profile of the issues may alter this preference if, for instance, 50% of the calls are from one question, called question X, alone. In that case, question X and its resolution could be incorporated into the knowledge bases, whether or not it is part of the domain ultimately chosen as a the selected domain. For purposes of calculating the percentage of queue for the domain indicator, data about question X can be removed from the data set and percentage of queue recalculated for the potential domain without question X. The Percentage of Queue metric may be developed from reports from the call tracking system 402, or from surveys where the agents are asked to estimate what percentage of their total call volume each potential domain represents.

First Time Fix (FTF) Attribute 320b

The First time fix (FTF) attribute 320b, the frequency that problems in the potential domain are resolved on a first call for technical support, is measured by a First Time Fix (FTF) Rate metric 315b. One way of calculating FTF Rate is the percentage of incidents resolved on the first call, compared to the total number of incidents. Alternatively, FTF rate is the percentage of transactions resolved, compared to the total number of transactions. An incident is an instance of a request for support, while a transaction is an instance of a contact for requesting support. An incident might be resolved in one transaction, or it might require numerous transactions to resolve. A true measurement of FTF rate requires calls to be tracked by incident rather than simply by transaction. Alternately FTF rate can be determined subjectively through customer surveys. The FTF valuation system 313b follows:

| First Time Fix (FTF) Rate valuation system 313b | |
| --- | --- |
| Points 323b | Description of Metric 315b |
| 0 | Higher than average for the team |
| 1 | Average for the team |

-continued

| First Time Fix (FTF) Rate valuation system 313b | |
|---|---|
| Points 323b | Description of Metric 315b |
| 2 | Below average for the team but possible |
| 0 | Below average for the team and not possible |

If the FTF rate is too low, there is usually a reason. It is possible that the problem is not addressable by an agent. Therefore, it is preferable to look for a rate that has the greatest possible improvement potential. FTF rates for potential domain are compared with the FTF rate for the team. To find the average FTF rate for the team, the average totals from several potential domains or other topics are averaged.

Escalation Attribute 320c

The escalation attribute 320c, the frequency that transactions are forwarded for assistance in resolution, is measured by two metrics: the Rate of Escalation to Mentor metric 315c–a and the Rate of Escalation to Customer metric 315c–b. The customer escalation rate is treated separately from the mentor escalation rate so that the customer rate can be weighted more heavily in the manner described below.

The Rate of Escalation to Mentor is the percentage developed from the number of transactions in which mentors are consulted for assistance in resolution, compared to the total number of transactions. Generally, the higher the rate of escalation to mentor, the more opportunity for benefit from knowledge base implementation. The consultation could be whether an actual forwarding of the call to the mentor, or it could constitute calling the mentor for advice while the person requesting support is waiting on hold. The number of transactions in which mentors provide advice while a person is on hold may be developed from mentor records, and the number of times that a call is forwarded to a mentor may be obtained from the telephone switching system, which can keep track of the total number of support requests that a mentor handles. The number of transactions in which a mentor is consulted is then the sum of the number of support requests that a mentor handles plus the number of transactions in which mentors provide advice while a person is on hold. The total number of transactions may also be obtained from the telephone switching system. The Rate of Escalation to Mentor would then be the percentage of transactions taken by the mentors, compared to the total number of transactions.

Alternatively, the Rate may be developed from focus groups and surveys where the agents service a potential domain are asked to rank the frequency that they request assistance from a mentor on a scale of 1 to 5, where 1 is never asking for assistance, and 5 is always asking for assistance. From the focus group and survey results, Rates of Escalation to Mentor for potential domains are developed for potential domains. The average rates from several potential domains are averaged to develop the Rate of Escalation to Mentor for the team. The Rates of Escalation to Mentor for potential domains are then compared to the Rate of Escalation to Mentor for the team. The Rate of Escalation to Mentor valuation system 313c–a follows:

| Rate of escalation to mentor valuation system 313c–a | |
|---|---|
| Points 323c–a | Description of Metric 315c–a |
| 0 | Less than average for the team |
| 1 | Average for the team |
| 2 | More than average for the team |

Rate of Escalation to Customer is the percentage developed from the number of transactions that are forwarded to customers for assistance in resolution, compared to the total number of transactions. As with the Rate of Escalation to Mentor, the higher the rate of escalation, the more opportunity for benefit from knowledge base implementation. The total number of transactions may be obtained from the telephone switching system, and the number of transactions that are forwarded to customers may be obtained in any suitable way, such as, for example, keeping track of the number of unbroken items returned to the customer, under the assumption that each returned item represents an unresolved support problem. Alternatively, the Rate The Rates of Escalation to Customer for potential domains and the Rate of Escalation to Customer for the team may be developed from surveys and compared in a manner analogous to the Rates of Escalation to Mentor, described above. The Rate of Escalation to Customer valuation system 313c–b follows:

| Rate of escalation to customer valuation system 313c–b | |
|---|---|
| Points 323c–b | Description of Metric 315c–b |
| 0 | Less than average for the team |
| 1 | Average for the team |
| 2 | More than average for the team but fixable |
| 0 | More than average for the team, not fixable |

The Rate of Escalation to Customer valuation system 313c–b has the additional component of whether the problem being escalated is fixable, because for customer escalation, a high escalation rate may be due to a high percentage of problems not being fixable. Zero value points are given to a domain having a high Rate of Escalation to Customer, where the problems are ultimately not addressable by the agent. There is no point in deploying a knowledge base for a domain where many questions have to be referred back to customer anyway. Therefore, a high escalation rate does not necessarily suggest that the potential domain is an excellent candidate for the desired seed domain. Like the Rate of Escalation to Mentor metric 315c–a, data for the Rate of Escalation to Customer Metric 315c–b may be collected for survey, with the frequency of escalation to customer being estimated using a ranking form one to five. If it is collected by survey, data for the customer escalation rates will be only collected from surveys from mentors because the valuation system 313c–b requires information about the percentage of problems that are not fixable, and mentors, being more experienced, will be more likely to be objective than agents in assessing what problems are not fixable.

Knowledge Gap Attribute 320d

The knowledge gap attribute 320d, which is the differences between a new agent and an experienced agent in ability to resolve a technical problem in the potential domain, is measured by the AHT Gap metric 315d. The AHT Gap is the difference in AHT for the domain between a new agent and an experienced agent. The higher the gap, the more potential for improvement when re-using knowledge. The differences in AHT are developed from data collected by the call tracking system 402, which collects data for each call on the identity of the agent and her average length of call. From that data, an agent's AHT may be developed. When the AHT is compared against with the agent's level of experience, it can then be categorized as a new agent AHT or an experienced agent AHT. A team's new agent AHTs are then averaged to develop a team new agent AHT. Similarly, experienced agent AHTs are then averaged to develop a team experienced agent AHT. The AHT gap metric 315*d* is the percentage derived from the team new agent AHT over the team experienced agent AHT. One AHT gap valuation system 313*d* follows:

| AHT gap valuation system 313d | |
|---|---|
| Points 323d | Description of Metric 315d |
| 0 | 0–10% gap |
| 1 | 10–20% gap |
| 2 | Above 20% gap |

Another way of measuring the differences between a new agent and an experienced agent in ability to resolve a technical problem in the potential domain is to use quality/service metrics to measure support performance. Quality metrics track the quality of the support provided in each incident or transaction where support is provided. Quality metrics are important to the customers whose products are being supported, and so are often included as specifically described in the contract between the support provider and the customer. Sometimes the amount of payment under the contract depends upon the quality/service metrics, so they drive revenue.

The quality metrics are FTF rate (described above), Escalation rate (described above), and Customer Satisfaction. Customer Satisfaction is an indicator that the customer believes measures end-user satisfaction with the support provided. Measurement and acceptable levels of customer satisfaction vary by customer. Sample metrics include survey results, random call monitoring, a customer satisfaction index, which differs from client to client, and which may be subjective or objective. A low measure of customer satisfaction for a domain or sub-domain indicates high potential for improvement in satisfaction by implementation of a knowledge base in the domain.

Quality metrics may be useful to measure the differences between a new agent and an experienced agent, but only if the domain in which the metrics are developed is at the same level of abstraction as the potential domain being analyzed for use as a desired domain. For example, if the quality metrics are developed for agents in a domain for which the potential domain is a sub-domain, the quality metrics will be too general to be useful in analyzing the suitability of the potential domain as the desired domain. In addition, if the quality metrics are developed for agents in a sub-domain of the potential domain, the quality metrics will not be general enough to be useful in analyzing the suitability of the potential domain as the desired domain.

When a quality metric is used to measure the difference between a new agent and an experienced agent, new agent values and experienced agent values are developed for the quality metric. The percentage derived from the team new agent value over the team experienced agent value is then the agent gap for the quality metric. Potential instantiations of the quality metric for the potential domain would then be analyzed for their potential benefit of selecting the target potential domain to be the desired domain 312, as demonstrated by the attribute 320 in its selected potential instantiation. A valuation system would then be developed for the quality metric to reflect the extent of the potential benefit.

Measurability Attribute 320*e*

The measurability attribute 320*e*, the ability of the potential domain to be measured, to generate metrics for benefit analysis and realization, is measured by developing a Measurability metric 315*e* based on the ability of the potential domain to be measured by a series of desired metrics. In the preferred embodiment, the series of metrics are (1) Number of Calls, a measurement of the number of requests for assistance with the potential domain, (2) a measure of the total average handle time, (3) a measure of the average handle time by agent; (4) a rate of escalations of problems to mentors, (5) a rate of escalation of problems to customers, and (6) a First Time Fix rate of resolving problems in a potential domain on a first request for assistance. In the Measurability valuation system 313*e*, one measurability metric value point 321 is assigned for each of the desired metrics whose calculation the potential domain is capable of supporting. The metrics value points 321 are summed, and the Measurability benefit value 323*e* is the summation of the metrics value points 321.

| Measurability valuation system 313e | |
|---|---|
| Points 321 | Description of Metric |
| 1 | Number of Calls |
| 1 | Total Average Handle Time (AHT) |
| 1 | AHT by Agent |
| 1 | Escalation to Mentors |
| 1 | Escalation to Customer |
| 1 | First Time Fix |

Note that measurability depends on any operational considerations required to fulfill the measurement. For example, if a manual log needs to be kept to determine the number of escalations to the customer, practically speaking it may be impossible or difficult to measure, whereas if escalations to the customer are tracked automatically in the call tracking system 402, the rate is easily measured.

Training Attribute 320*f*

The training attribute 320*f*, the training that a team receives for a potential domain requires, is measured by a Portion of Training metric 320*f*. The Portion of Training is the amount of training that a team receives for a potential domain, compared to the total amount of training that a team receives. Portion of training indicates the possibility of benefit of replacing some of the training in the potential domain with a knowledge base. Since the goal is to determine how much training can possibly be eliminated due to the knowledge base, training benefit values 323*f* are assigned with reference to a review of the potential domain's training syllabus to determine time spent on teaching a particular domain. The Portion of Training valuation system 313*f* follows:

| Portion of training valuation system 313f | |
|---|---|
| Points 323f | Description of Metric 315f |
| 1 | 0–20% of training for the team |
| 2 | 20–40% of training for the team |
| 1 | 40–60% of training for the team |
| 0 | More than 60% of training for the team |

When a potential domain requires more than 60% of the training provided to a team, the domain is probably too large to handle as a knowledge base.

Repetition Attribute 320g

The repetition attribute 320g, the times that questions are repeated in a potential domain, is measured by the Repetition metric 315g. The Repetition metric 315g is the percentage developed from the number of times that a question is repeated in a potential domain, compared to the total number of questions raised for a potential domain. If the rate of repetition is too high, agents will 'know the answer off the top of their heads' and be less likely to see value in using the knowledge base. If the rate of repetition is too low, it will take a long time to build the knowledge base with enough data to show solid benefits.

Generally, the rate of repetition inversely correlates to the number of seed cases required before a knowledge base is deployed, so a low repetition rate will require a large number of seed cases, and a high repetition rate will require few seed cases. There is a sweet spot for repetition (somewhere between always and never facing a new issue) that will encourage the use of the knowledge base while facilitating seed case construction. Repetition benefit values 323g are assigned with reference to the results of surveys in which the agents are asked to estimate what percentage of their total call volume represents "repeat calls" as opposed to "unique calls", where repeat calls suggest the same question or similar type of issue and a unique call occurs less frequently and the resolution is not as readily known or available as are resolutions to repeat calls. The repetition valuation system 313g follows:

| Repetition rate valuation system 313g | |
|---|---|
| Points 323g | Description of Metric 315g |
| 0 | Sweet spot Less than 30% |
| 1 | Sweet spot Between 30% and 60% |
| 2 | Sweet spot Above 60% |

Leverageability Attribute 320h

The leverageability attribute 320h, which is the ability of the knowledge about a potential domain to provide benefit outside of the potential in, is measured by the Leverageability metric 315h. The benefit could be to other domain within the support team, or other teams providing support under a support contact to domains, or even to an audience outside of the support contract. Leverageability is closely linked with product interoperability, because a resolution for a product having an interoperability problem generates knowledge for the other products with which the product was associated. Therefore, a potential domain's leverageability is evaluated determining the frequency of interoperability problems in the potential domain. Leverageability benefit values 323h are assigned with reference to the results of surveys in which the agents are asked to estimate what percentage of their total call volume represents problems involving interoperability issues, or problems that relate to more than one product. The leverageability valuation system 313h follows:

| Leverageability valuation system 313h | |
|---|---|
| Points 323h | Description of Metric 315h |
| 0 | Not leverageable for other domains within a team. |
| 1 | Leverageable to some but not all of the other domains in the team, but not outside the team. |
| 2 | Leverageable to all of the domains in the team, and leverageable to other teams within the support contract. |
| 3 | Leverageable to an audience outside of the contract |

When determining leverageability, one must consider both the domain knowledge itself and the security of the knowledge, because information that must be held confidential may carry use restrictions that could prevent its use outside of supporting the potential domain.

Developing Actual Attribute Values 326

Figure 8:
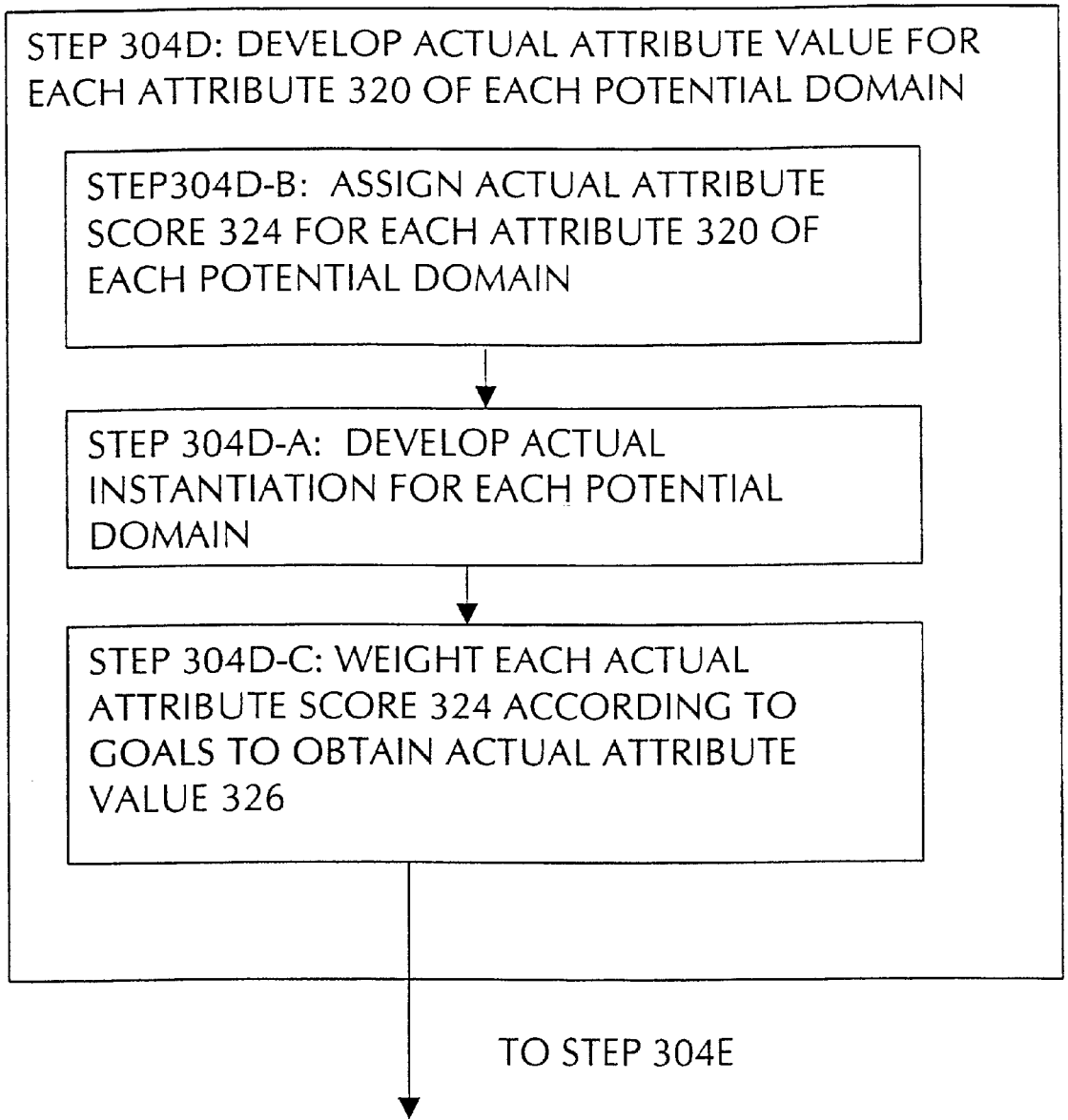
FIG. 8 is a block diagram of the domain analysis step 304d shown in FIG. 7.

When the valuation system 313 is developed, step 304d involves developing actual attribute values 326 for each attribute 320 of each potential domain. The process for developing the actual attribute values 326 is outlined in FIG. 8. First, in step 304d–a, an actual instantiation is developed for a target potential domain by, for example, identifying an actual characteristic of the target potential domain, or, for an attribute that is measurable, measuring the target potential domain. Then, in step 304d–b, an actual attribute score 324 is assigned for each attribute 320 of the target potential domain from the attribute valuation system 323 of the attribute 320, with the actual attribute score 324 based on the actual instantiation. Finally, in step 304d–c, each of the actual attribute scores 324 are weighted according to goals to develop the actual attribute value 326.

Domain Indicator 316

Returning to FIG. 7, once the potential domains are identified and an actual attribute value 326 is established for each of the forecasting attributes 320 of each potential domain, the potential domains are evaluated and prioritized in order to identify a desired seed domain for the knowledge base. In the preferred embodiment, in step 305, a domain indicator 316 is developed to indicate a preferred candidate among the potential domains for the desired domain. The domain indicator 316 details the analysis of support subject areas to identify the seed domain of the knowledge base.

FIG. 10 is an example of a domain indicator 316 developed for four potential domains. The potential domains could be categorical, such as different products, but in this case, the potential domains in question are functional domains, which are different functionalities within a product. The domain indicator may be incorporated into a spreadsheet, with products P1 and P2 shown along the x axis of the spreadsheet, and functions F1 and F2, being two functions that both products P1 and P2 possess, are along the y axis of the spreadsheet. Therefore, the potential domains in question are F1P1, F1P2, F2P1, and F2P2, each representing one of the two functionalities in the two products.

Actual instantiations of the potential domain are developed and analyzed to assign attribute benefit values 326 to each of the attributes 320 to develop an actual attribute score 324 for each attribute 320 of the four potential domains. Weights 317 that were assigned for each attribute 320 in Step 304d–c are filled out in the spreadsheet.

The weights 317 are assigned to each actual attribute score 324 according to the goals of the program. For instance, if the goal is increased productivity, the actual AHT gap score 324d may be weighed more heavily than other scores 324. The actual AHT Gap score 324d would also be weighted more heavily if the team's attrition rate is high, indicating a higher proportion of more junior team members. Alternatively, if the goal were to capture knowledge to increase the knowledge base asset, actual leverageability score 324h would be weighed more heavily.

Assigned weights 317 for each attribute 320 are multiplied to their associated actual attribute scores 324 to develop an actual attribute value 326 for each attribute 320 in each of the four domains.

The actual attribute values 326 are summed to derive potential domain suitability values 311. In this example, the potential domain suitability value 311a for domain F1P1, being functionality F1 for product P1, is 42. The potential domain suitability value 311b for domain F1P2, being functionality F1 for product P2, is 57. The potential domain suitability value 311c for domain F2P1, being functionality F2 for product P1, is 41. In addition, the potential domain suitability value 311d for domain F2P2, being functionality F2 for product P2, is 66. A comparison of the potential domain suitability values 311 indicates that the F2P2 domain suitability value 311d is the highest, and therefore F2P2 may be selected for the desired domain 312.

The domain indicator 316 of Step 305 in FIG. 7 could be used to select more than one desired domain 312. For example, if two desired domains are to be selected, a choice criterion would be selected to meet the goals of the knowledge base development. One choice criterion could be to select the two potential domains having the highest potential domain suitability values 311. For the above example, the two highest potential domain suitability values are 57, the potential domain suitability value 311b for potential domain F1P2, and 66, the potential domain suitability value 311d for potential domain F2P2. Therefore, the potential domains F1P2 and F2P2 would be selected as the desired domains 312 of FIG. 7.

Alternatively, if a decision was made to seed the knowledge base with the same functionality from two products, the choice criterion would be to select the functionality with the highest combined potential domain suitability values 311. The potential domain suitability values 311a and 311b for functionality F1 and the potential domain suitability values 311c and 311d for functionality F2 could be summed to develop a functionality domain suitability values 311c–a, 311c–b respectively. In the example, the functionality domain suitability value 311c–a for functionality F1 is 99, and the functionality domain suitability value 311c–b for functionality F2 is 101. Since the values are almost identical, a desired domain is not indicated for domains of the same functionality.

Another criterion about choosing a desired domain 312 could be selected. For example, a decision could be made to test seeding the knowledge base with two functionalities from the same product. The choice criterion would be to select the product with the highest combined potential domain suitability values 311. The potential domain suitability values 311a and 311c for product P1 and the potential domain suitability values 311b and 311d for product P2 could be summed to develop product domain suitability values 311f–a, 311f–2 respectively. The product domain suitability value 311f–a for product P1 is 83, and the product domain suitability value 311f–b for product P2 is 123. In the example, product P2, which clearly has the highest product domain suitability value 311f, would be selected.

Recursive Domain Indicator Process 90

Figure 11:
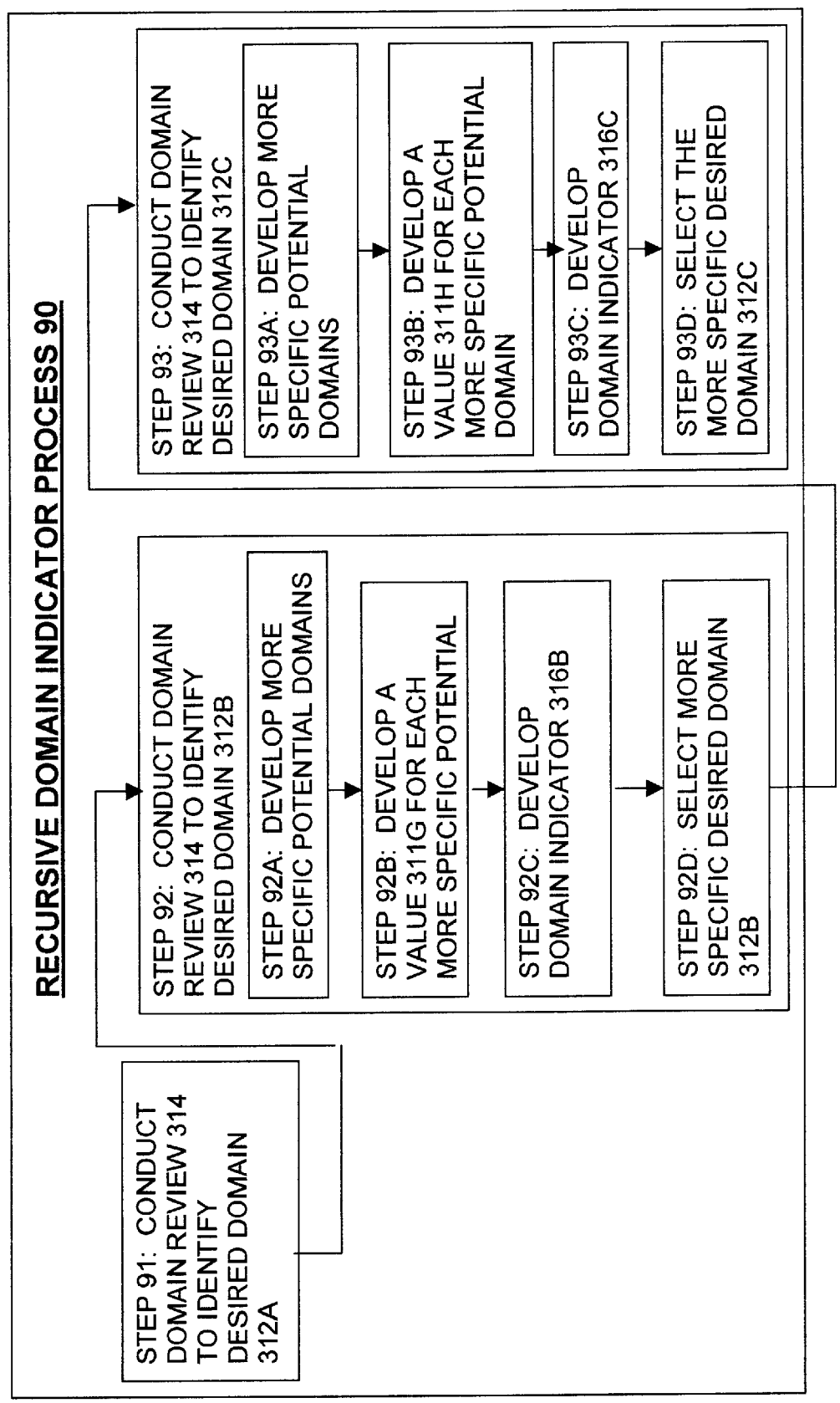
FIG. 11 is a block diagram of the process 90 for using the knowledge domain indicator 316 recursively.

A domain indicator 316 may be developed more than once in a domain analysis to assist in selecting more specifically defined desired domains 312. For example, FIG. 11 shows a Recursive Domain Indicator Process 90 for using a domain indicator 316 to narrow the subject matter of a desired domain 312. Recursive Domain Indicator Process 90 starts with a Step 91, in which a domain indicator 316a may be developed to help identify a support team that would benefit from the deployment of a knowledge base. If so, the desired domain 312 would be the selected support team 312a. The process to select a desired domain 312a would be the domain analysis review 314 described in FIGS. 7 and 8.

In Step 92, a second domain indicator 316b could be developed to help identify a desired domain 312b within the selected support team domain 312a, such as the application or product that is supported by the selected team that would benefit from incorporation of knowledge about it into a knowledge base. In Step 92a, the selected support team domain 312a could be apportioned into more than one more specific potential domains. In Step 92b, a more specific potential domain suitability value 311g would then be developed for each of the more specific potential domains in the second set. The more specific potential domain suitability value 311g indicates the suitability of the more specific potential domain for which the more specific potential domain suitability value 311g was developed for becoming the more specific desired domain 312b. In Step 92c, a domain indicator 316b is developed to compare the more specific potential domain suitability values 311g. In Step 92d, the more specific desired domain 312b is selected from the more specific potential domains based on the comparison.

A third domain indicator 316c could be then be developed in Step 93 to help identify another desired domain 312c, such as product or application type or functionality within the selected application or product that would benefit from being the desired seed domain. In Step 93a, the desired domain 312b could be apportioned into more than one more specific potential domains. In Step 93b, a more specific potential domain suitability value 311h would then be developed for each of the more specific potential domains in the third set. The more specific potential domain suitability value 311h indicates the suitability of the more specific potential domain for which the more specific potential domain suitability value 311h was developed for becoming the more specific desired domain 312c. In Step 93c, a domain indicator 316c is developed to compare the more specific potential domain suitability values 311h. In Step 93d, the more specific potential domain suitability values 311h are compared and the more specific desired domain 312c is selected from the more specific potential domains based on the comparison.

In using the Recursive Domain Indicator Process 90, care should be take to ensure that the appropriate attributes 320 are analyzed to develop the potential domain suitability values 311. Different attributes 320 and different attribute valuation system 313 may be necessary to evaluate the suitability of domains 312 at different levels of abstraction.

Reservoir analysis 330

Figure 12:
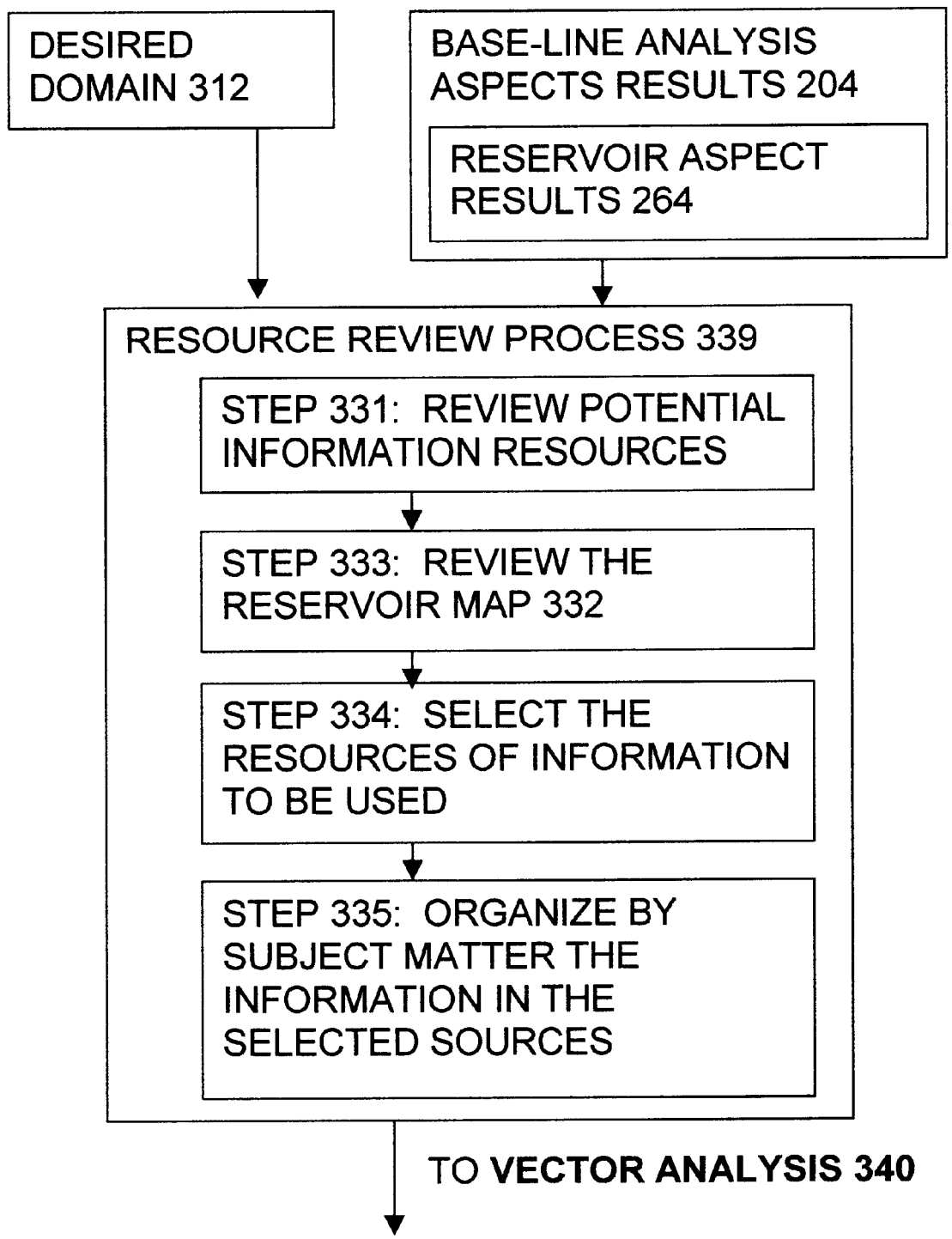
FIG. 12 is a block diagram of the resource review 339 shown in FIG. 6.

Once the desired domain(s) 312 are selected, the domain analysis phase 310 is completed. Returning to FIG. 6, and referring to FIG. 12, the reservoir analysis phase 330 evaluates the resources necessary to seed the knowledge base. The resources review process 339 for the present invention starts with a step 331 of reviewing potential information resources useful for building knowledge in the knowledge base. In a step 333, the reservoir map 332 is reviewed to detail all of the resources of information. In a step 33, the resources of information in the reservoir map 332 to be used for seeding the desired knowledge base are selected. In a step 335, the information in the resources is organized by subject matter. For ease of reference, the reservoir map 332 may be organized into a knowledge reservoir matrix 336.

Inputs into the resources review process 339 are the desired domain 312 and the surveying that was conducted in the base-line analysis, particularly the reservoir aspect results 264. The selecting step 334 involves analyzing the quality of the potential resources, and determining the age, freshness, and ability to update or obtain feedback from a resource. Data ownership and any use restrictions that might interfere with the free use of the data are identified. Step 335 involves organizing the information by subject matter so that when the authoring phase of the knowledge base construction process begins, the information will be ready for the authoring process. In this way, it will be easier to populate the knowledge base.

Vector analysis 340

General

Referring to FIG. 6, the vector analysis 340 involves determining how to organize the information that is going to be stored in the knowledge base system 10. In so doing, the vector analysis 340 defines the architecture 342 of the knowledge base. Inputs into the vector analysis 340 are the desired domain 312 and baseline analysis results 204, especially the team aspect results 252 and the workflow aspect results 256. During the architecture definition 341, authoring conventions and guides containing the architectural definitions are developed to provide knowledge base uniformity during authoring of the knowledge base.

Architecture 342

Figure 1B:
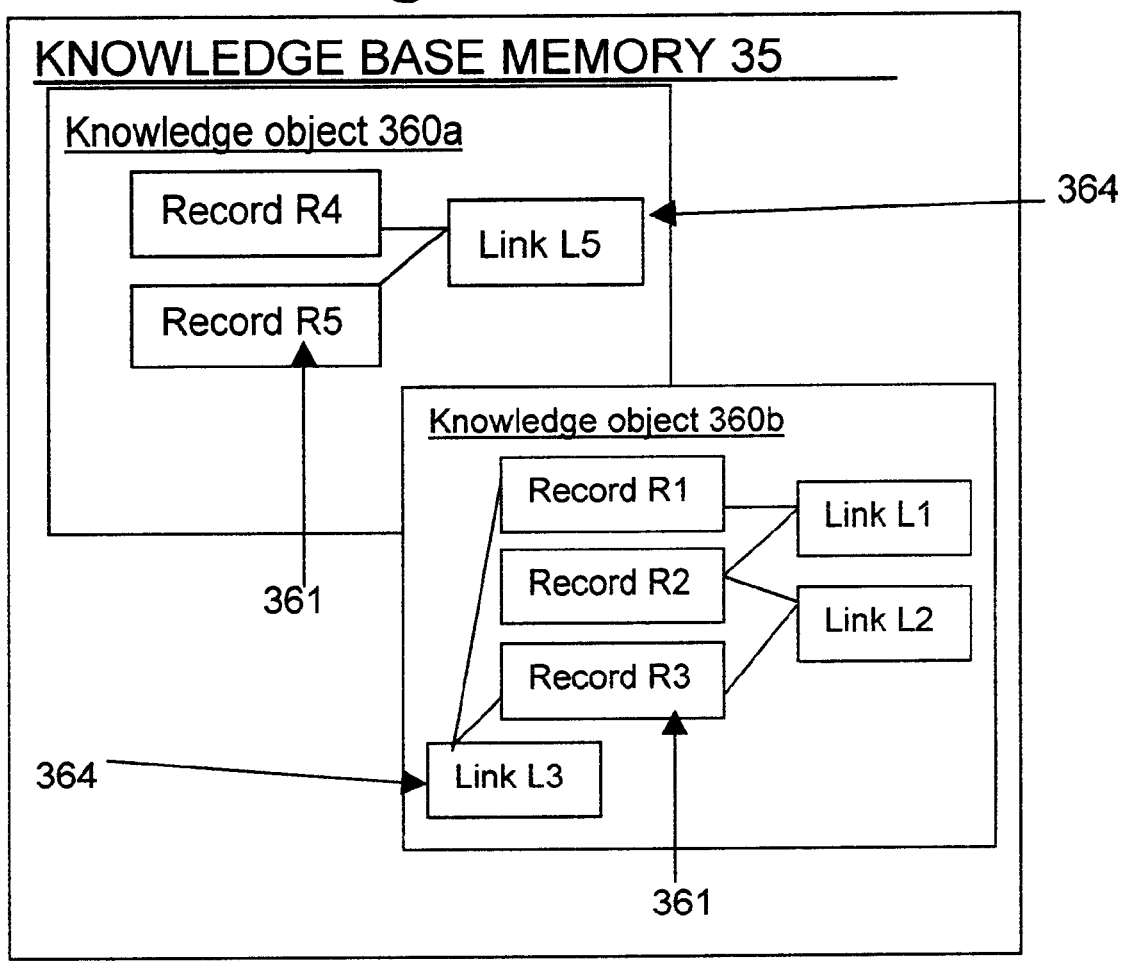
Figure 13B:
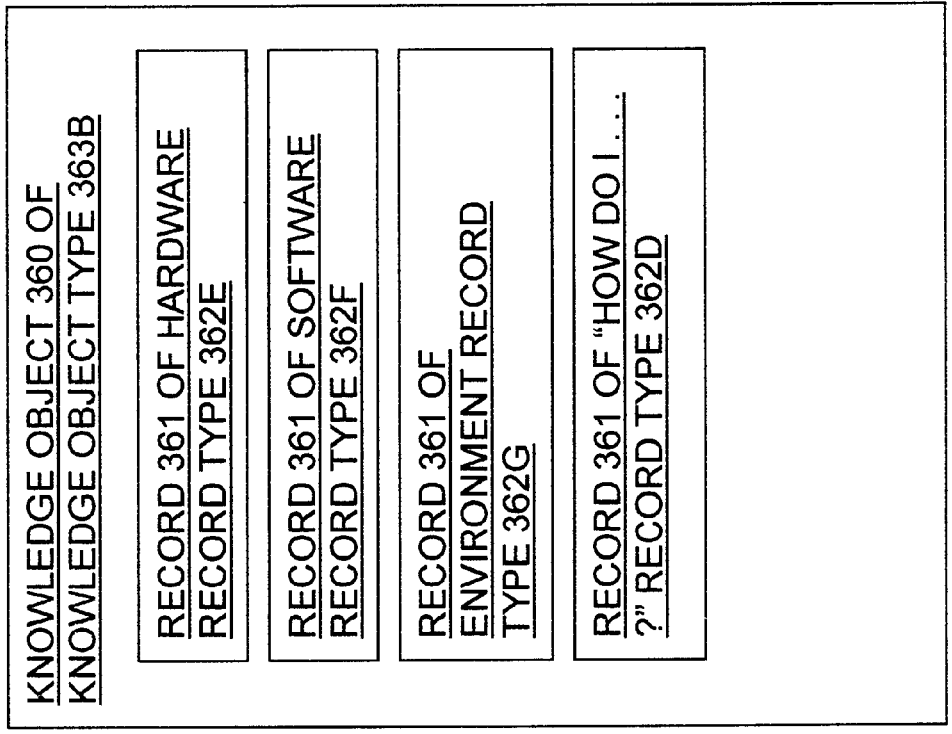
FIG. 13b is a diagrammatic representation of another kind of knowledge object 360 shown in FIG. 1.
Figure 13A:
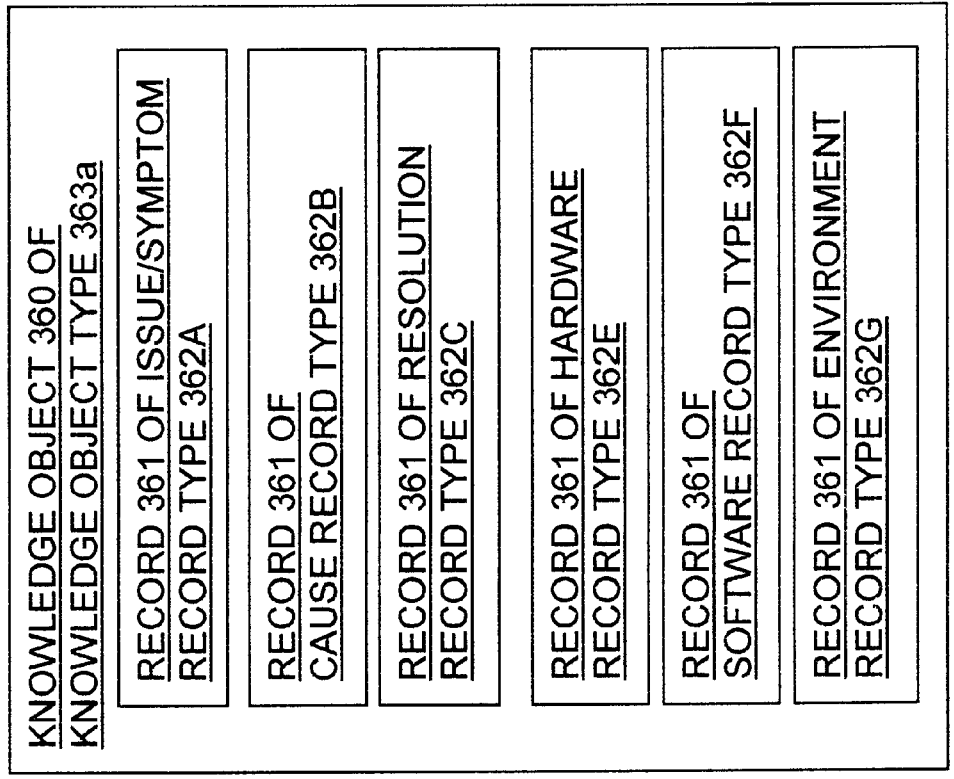
FIG. 13a is a diagrammatic representation of a knowledge object 360.

Returning to FIG. 1 while referring to FIGS. 1b, 13a and 13b, in the knowledge base system 10 of the present invention, the information in the knowledge base memory 35 is stored in knowledge objects 360 having a plurality of elements of information consisting of records 361 having associations, also known as links 364, between them. FIG. 1b shows knowledge objects 360a, 360b stored in the knowledge base memory 35. Knowledge object 360a has records R4 and R5. Records R4 and R5 are linked by link L5. Knowledge object 360b has records R1, R2, and R3. Records R1 and R2 are linked by link L1, records R1 and R3 are linked by link L3, and records R2 and R3 are linked by link L2.

The definitions of knowledge object types 363a, 363b and record types 362a, 362b, 362c, 362d, 362e, 362f, 362g depend on the domain of the particular knowledge base. Inputs into record type 362a, 362b, 362c, 362d, 362e, 362f, 362g definition include requirements of the intended beneficiaries of the knowledge base, particularly any customers sponsoring the development of the knowledge base. In the preferred embodiment, the knowledge object types 363a, 363b and record types 362a, 362b, 362c, 362d, 362e, 362f, 362g and definition also depend on the multi-customer goals and strategy of the developer of the knowledge base.

In the technical support environment of the preferred embodiment, knowledge objects 360 represent a full support interaction, and records 361 represent the factual elements of the interaction. The architecture of the present invention treats the knowledge embodied in the support interaction as an object. The objectified knowledge, and the manner in which it is objectified and incorporated into the knowledge base system 10 are described in detail in the related applications, U.S. Ser. No. 09/379,694, entitled *Method and System for Use and Maintenance of a Knowledge Base System*, by Sharon Stier, Debra Ann Haughton, and Joseph Melino (Applicant Reference No. S1/P04); and U.S. Ser. No. 09/379,692, entitled *Method of Incorporating Knowledge into a Knowledge Base System*, by Sharon Stier and Debra Ann Haughton (Applicant Reference No. S1/P05), both of which are filed on the even date herewith and are herein incorporated by reference.

Referring to FIGS. 13a and 13b, the architecture of the preferred embodiment supports resolution knowledge object type 363a and "How do I" knowledge object type 363b. The resolution knowledge object type 363a of the preferred embodiment identifies the factual circumstances of a support interaction and presents a resolution for the identified support interaction. It requires several record types to define the support interaction. The resolution knowledge object type 363a has three support record types (Issue/Symptom record type 362a, Cause record type 362b, Resolution record type 362c), and three product-specific record types (Hardware record type 362e, Software record type 362f, Environment record type 362g). The "How do I" knowledge object type 363b provides step by step instructions for installing, operating, or maintaining products. It has the three product-specific record types (Hardware record type 362e, Software record type 362f, Environment record type 362g) and a "How do I . . . ?" record type 362d.

Each record type in the resolution knowledge object types 363a except the "How do I . . . ?" record type 362d is defined to include synonyms to capture alternative statements of the knowledge. Synonyms are used by the knowledge engine in finding matches during searches. Numerous synonyms can strengthen the activation on a record. The knowledge base architecture 342 could be defined to store the most recognized synonym among the set of synonyms in the record 361 as the main descriptor of the knowledge, in other words as the record name. The other synonyms in the set could be stored as synonym descriptors of the knowledge.

Also included in the definition of records 361, and therefore in each record type 362a, 362b, 362c, 362d, 362e, 362f, 362g are elements known as concepts, hypertext and facets, not shown, which are components of the Knowledge-Bridge™ product developed by ServiceWare, Inc. of Oakmont, Pa., with which the architecture 342 is implemented. Concepts are the phrases or short sentences that the knowledge engine 30 for a knowledge based system 10 based on object-oriented programming uses to make links and associations. Hypertext is documentation contained in the knowledge base, linked to and reachable from one or more concepts in the knowledge base. It is used to attach additional information to a concept. For, Issue/Symptom record types 362a, Cause record types 362b, Hardware record types 362e, and Software record types 362f, the information in hypertext is questions or tests to accept or negate the record. For Resolution record types 362c, it provides advice and instructions to the knowledge base end users. Hypertext has only a single font and can not contain graphics or special formatting. Hypertext may be implemented with multiple levels, with other hypertext levels, for example more detailed sets of instructions, accessible through hyperlinks.

Facets are documents that are used with multiple concepts, for information that is often procedural or definitional. Unlike hypertext, document facets are located external to the knowledge base and can contain different formats with graphics. In the preferred embodiment, facets are HTML documents to allow for more flexibility in formatting and graphics than the Hypertext within the knowledge base. In the preferred embodiment, facets contain the private information about the subject matter of the record. Such private information could be confidential information of the developer of the product being supported. It could be used to solve an end-user's problem, but not disclosed to the end user.

Authoring Conventions and Guides

While developing the architecture of the knowledge base, authoring conventions and guides are developed to add uniformity to authoring output. The conventions and guides have definitions and further have guidelines for format and development of the records. They detail the structure of the records and provide a standard format for all the different kinds of records supported by the architecture. The standard format will guarantee consistency when seeding and later maintaining the knowledge base. The standard format may include guidelines for capitalization, punctuation, abbreviation, and for phrasing (e.g. tense).

The conventions and guides also contain guidelines for use of synonyms. In the preferred embodiment, synonyms could be alternate words (different words with essentially the same meaning), or they could be different grammatical form of a synonym (nouns, verbs, tenses, spellings), as well as alternate application categories. If different versions of a word are included in a record, the probability increases of the record being retrieved in a search of the knowledge base. In addition, a record could have a knowledge object name that could be used as a synonym so that the name is repeated in the record, the repetition thus increasing the probability of the record being retrieved in a search of the knowledge base.

Finally, the conventions and guides provide guidelines for selecting the appropriate level of granularity of a record. The granularity selected for a record is very important. If chosen too high, the knowledge base operates more as a general reference than as a true knowledge delivery system. If selected too high, it operates more as a decision tree, which requires frequent, extensive maintenance of the knowledge base. Each record's level of granularity may differ, so that product records may have high granularity (to cover the number of products in the domain) while Issue/Symptom granularity may be low (to match the usually general manner in which end users describe their problems. The authoring guidelines provide guidelines for selecting the appropriate granularity, or specificity, of each record type that makes up a knowledge object.

Plan development

General

After the vector analysis 340 is completed, a construction and seeding plan 350 for the knowledge base system 10 is developed. The desired domain 213, reservoir map 336 and knowledge base architecture 342 are inputs for the construction and seeding plan 350. The plan defines the seed domain, the reservoirs which will be used, an estimate of the time and resources required for construction, and the domain seeding methodology 352. A domain matrix 318 is also created to quantify team goals and define the extent a knowledge base should be seeded prior to activation.

Domain seeding methodology 380

The seeding methodology 380 is developed for seeding sub-domains of the desired domain into the knowledge base prior to activation of the knowledge base. The seeding methodology 380 involves a preferred seeding order 386 for seeding the knowledge base memory with sub-domains 382 of the desired domain 312, and an identification of the extent 388 of seeding necessary prior to activation.

FIG. 14a is a diagrammatic representation of the process 390 for developing the domain seeding methodology 380. As shown in FIG. 14a, the process 390 involves a step 391 for developing for each sub-domain 382 a seeding priority value 384 that indicates a level of importance of seeding the sub-domain 382 into the knowledge base, a step 393 for comparing the seeding priority values 384 for each sub-domain 382, and a step 394 for developing the preferred seeding order 386 for seeding based on the comparison of the seeding priority values 384.

The seeding priority values 384 may be developed subjectively, with the sub-domains 382 evaluated and their associated seeding priority values 384 developed, for example, after reviewing the results use of surveys and interviews. Alternatively, they may be developed following the procedure for developing the potential domain suitability value 311 in step 304 of the domain analysis review 314, shown in FIG. 7. Step 391 involves steps 304'a through 304'e, which track steps 304a through 304e of step 304.

In a step 304'a, the desired domain 312 is apportioned into sub-domains 382. In step 304'b, forecasting attributes 320 in the form of selected sub-domain characteristics 392 are identified. Selected characteristics 392 could be product history, product complexity, likely life cycle of the product, if a product is the subject matter of the sub-domain, repeatability of issues arising in supporting the sub-domain, leverageability of the sub-domain, goals of the beneficiaries, metrics to be used, willingness and ability of users of the knowledge base to seed themselves, and the range or diversity of questions that will be presented to agents using the knowledge base. Measures of Customer Satisfaction, described above, are also used in the seeding methodology analysis. A low measure of customer satisfaction for a domain or sub-domain indicates a high potential for improvement in customer satisfaction by implementing a knowledge base in the sub-domain 382.

In step 304'c, an attribute valuation system 313 in the form of a sub-domain characteristic valuation system 395 may be developed for each of the selected characteristics 392. In step 304'd, an actual attribute value 326 in the form of an actual characteristic value 96 may be developed for the actual instantiation of each selected characteristic 392 in each sub-domain. If desired, the an actual characteristic value 96 could be weighed according to goals of the knowledge base development. In step 304'e, a potential domain suitability value 311 in the form of a seeding priority values 384 for a sub-domain may be developed by combining the actual characteristic values 96 for the sub-domain to generate seeding priority values 384.

When seeding priority values 384 are assigned to each sub-domain 382, they are compared in step 393 so that in step 394 a preferred order of seeding 386 may developed. In step 394, a seeding order assignment 381 is provided to each sub-domain 382 following the procedure for selecting a desired domain in step 306 of the domain analysis review 314. Shown in FIG. 14b, step 394 involves steps 394a through 394z. In step 394a, the sub-domain 382a having the highest seeding priority value 384a is identified, a first seeding order assignment 381a is assigned to the sub-domain 382a, and the sub-domain 382a is removed from the set of sub-domains. In step 394b, the sub-domain 382b having the highest seeding priority value 384b among the remaining sub-domains is identified, a second seeding order assignment 381b is assigned to the sub-domain 382b, and the sub-domain 382b is removed from the set of remaining sub-domains.

The process of identifying the sub-domain with the highest value 384, assigning an assignment 381, and removing the sub-domain 382 from the set of remaining sub-domains 382 is repeated in steps 394c–394z until each of remaining sub-domains 382 in the set has assigned to it a seeding order assignment 381. Thus, the sub-domains are ranked in numerical order of their associated sub-domain seeding priority values 384, from highest to lowest seeding priority values, from the sub-domain 382a having the highest seeding priority value 384a assigned the first seeding position, to the sub-domain 382z having the lowest seeding priority value 382z assigned the last seeding position.

The process of step 394 may be facilitated by organizing the seeding priority values 384 into a seeding order indicator 95, which would list the sub-domains and their associated seeding priority values 382.

The methodology further involves an identification of a sub-domain seeding volume 398 to indicate an extent 388 of the seeding of each sub-domain prior to activation of the knowledge base. The sub-domain seeding volume is an estimate of the number of knowledge objects 360 to be entered into the knowledge base memory 35 in order to capture the knowledge about the sub-domain 382. Focus groups are particularly useful in developing the estimates of how many seed cases will be necessary to initially populate the sub-domain into the knowledge base memory 35. Identifying the seeding extent 388 also involves identifying a domain seeding volume 396 for the domain 312. The domain seeding volume 396 is calculated by totaling the sub-domain seeding volumes 398 for each of the sub-domains 382.

In order to facilitate the seeding, the seeding methodology 380 may be represented in a domain matrix 318, shown in FIG. 15. FIG. 15 identifies the sub-domains and details the preferred seeding order 386 and the domain seeding volume 396 for the desired domain 312. The desired domain 312 is a product that has been apportioned into ten functionalities sub-domains F1–F10. The first column of the matrix 318 is for identifying the sub-domain 382; each row of the domain matrix 318 contains the seeding information for one of the sub-domains. Other columns of the matrix 318 are for details about the seeding information for each of the sub-domains 382, for example sub-domain seeding volume 398 and the preferred seeding order 386 for each of the sub-domains F1–F10. In addition, one column of the matrix 318 contains an identification of knowledge reservoirs for each of the sub-domains. Another contains a sub-domain knowledge key that identifies essential information such as knowledge availability or other pertinent information for the each of the sub-domains F1–F10. The knowledge availability key 397 for the preferred embodiment follows:

| Sub-Domain Knowledge key 397 | |
|---|---|
| Key | Description of Key |
| 1 | Mentors know domain today |
| 2 | Knowledge is available from the customer. |

-continued

| Sub-Domain Knowledge key 397 | |
|---|---|
| Key | Description of Key |
| 3 | Domain must be supported ( |
| 4 | Have legacy of information; may need updating |

Thus, the domain matrix quantifies team goals and defines the extent a knowledge base should be seeded prior to activation.

Operational processes specifications development

During the in-depth analysis phase 300, specifications 370 for operational processes 400 for use of the knowledge base are developed. Returning to FIG. 1a and FIG. 2, the operational processes 400 include front end processes 70A for the front end 20 and back end processes 70B for the back end 40. The front end processes 70A include a knowledge base use process 410 for use of the knowledge base system 10 and a knowledge maintenance system 450 for maintaining and continuously improving the knowledge base system 10. The back end processes 70B include a knowledge monitoring system 430 for monitoring knowledge base operations. The back end processes 70B also include an integration system 770 for knowledge base integration with any systems or processes (both automated and manual) with which the front and back ends 20, 40 will interact or co-exist, such as the call tracking and customer reporting systems.

The front end processes 70A also include the workflow system 470 for use of the planned knowledge base system 10, which is developed as part of the development of specifications for operational processes 400. Decisions are made as to who will use the knowledge base and how they will use it. Decisions are also made as to who will maintain the knowledge base and how they will maintain it. In the preferred embodiment, the workflow system 470, shown in more detail in FIG. 16, involves the knowledge base use process 410 for agent use of the knowledge base system 10 and the knowledge maintenance system 450 for maintenance for the system 10.

The knowledge base use process 410 allows agents 13, including support engineers 13' and support mentors 13", to use the knowledge base system 10 to answer support queries and to provide maintenance feedback. The knowledge maintenance system 450, shown in more detail in FIG. 16, keeps the knowledge base system 10 accurate, targeted and updated. It provides for populating the knowledge base system 10 and for the review of queries from agent 13, and for updating the knowledge base memory 35 if a need for new content is indicated by the query. It also involves the process by which the knowledge analysts 15 monitor the backlog of the knowledge authors 14 and provides quality review of the authoring output. It also involves the process by which the knowledge analysts 15 obtain any necessary additional input (from, for example, the customer whose product is the subject matter of the new knowledge), and feeds it back to the knowledge authors 14.

As shown in FIG. 16, the knowledge maintenance system 450 also includes processes a knowledge author 14 or agent 13 would use to add, modify, and delete the records and knowledge objects in the knowledge base memory 35 and an escalation process 115.

In developing the specifications 370 for the operational processes 400, team resources are evaluated and workflow specifications 472 for the user and knowledge administration workflow system 470 are developed. Workflow specifications 472 are contained in a work flow document, not shown, that describes users' expected interactions with the knowledge base, the call tracking and call routing systems once the knowledge base system 10 is operational. Production resources needed to support the ongoing knowledge base effort once deployed are detailed.

Developing the specifications 370 for the operational processes 400 also involves defining the knowledge base graphics user interface 480 of the front end 20 to support the use process 410 and maintenance system 450. The GUI definition is recorded in the GUI specifications 482. Also, the-knowledge monitoring reporting subsystem 42 and knowledge maintenance reporting subsystem 46 of the back end 40 are developed to support, respectively, the knowledge monitoring system 430 and knowledge maintenance system 450. Subsystem 46 provides reports to authors 14, informing them of the need to maintain the knowledge base, and to knowledge analysts 15, assisting them in managing authoring output backlog. Subsystem 42 presents metrics describing the use of the knowledge base system 10.

The knowledge maintenance system, the knowledge monitoring system 430, the monitoring reporting subsystem 42, and the maintenance reporting subsystem 46 are described in detail in the co-pending related patent applications, U.S. Ser. No. 09/379,687, entitled *Method and System for Monitoring Knowledge Use*, by Sharon Stier and Debra Ann Haughton (Applicant Reference No. S1/P03) and U.S. Ser. No. 09/379,694, entitled *Method and System for Use and Maintenance of a Knowledge Base System*, by Sharon Stier, Debra Ann Haughton, and Joseph Melino (Applicant Reference No. S1/P04), both of which were filed on the even date herewith and are herein incorporated by reference.

Developing the specifications 370 for the operational processes 400 also involves developing a knowledge flow specification 492 to specify the system and process flows to ensure knowledge data integrity between beneficiaries of the knowledge base. For example, in the preferred embodiment, specifications are defined for knowledge flow between the users of the knowledge base and the customers whose products they are supporting.

In addition, an integration specification 792 is developed for the integration system 770 to specify how to accomplish the integration necessary between the knowledge base system and the systems involved in knowledge flow specification 492. If a customer is maintaining its own knowledge base, specifications for procedures and integration between the systems will be developed to keep the knowledge in synch between the two companies.

A call tracking integration specification, not shown, is developed to document the functional and detailed specifications of the data passed between the call tracking system (not shown) and the knowledge base system 10. If the customer owns the maintenance of the call tracking system, coordination procedures are detailed to provide close links between the knowledge base administration team and the customer so that the impact of changes in either system are minimized.

Development Phase

General

In the development phase, the knowledge base is constructed and seeded in accordance with the construction and seeding plan, the operational processes are developed in accordance with their specifications, and a deployment plan is developed for deployment of the knowledge base and operational processes.

Knowledge base construction and seeding

General

The knowledge base is constructed and seeded for the selected domain using the reservoirs identified in the reservoir mapping and the architecture defined in the vector analysis 340. Following the authoring conventions and guides and templates developed in the vector analysis, the authors 14 develop seed case knowledge objects for the domain, in the order and numbers developed with the assistance of the seeding methodology indicator using the seed case development process 140 and an innovative authoring methodology involving objectifying the knowledge.

The seed case knowledge objects they develop are developed using the knowledge object types 363a, 363b defined in accordance with the knowledge base architecture 342 that was developed in the vector analysis 340. As the knowledge objects to be incorporated into the knowledge base are identified using the seed case development process 140, the knowledge base takes form. Once the seed case knowledge objects are defined, they are incorporated into the knowledge base memory 35 using the knowledge base populating process 80.

The authoring methodology, the seed case development process 140, and the knowledge base populating process 80 are described in detail in the related co-pending patent applications, U.S. Ser. No. 09/379,694, entitled *Method and System for Use and Maintenance of a Knowledge Base System*, by Sharon Stier, Debra Ann Haughton, and Joseph Melino (Applicant Reference No. S1/P04), and U.S. Ser. No. 09/379,692, entitled *Method of Incorporating Knowledge into a Knowledge Base System*, by Sharon Stier and Debra Ann Haughton (Applicant Reference No. S1/P05).

Operational processes 400 development

General

Returning to FIG. 2, operational processes 400 are developed in accordance with the specifications 370 drawn up in the in-depth analysis phase 300. The systems development team utilize the specifications 370 to deliver all required hardware and software, including the graphics user interface 480 as defined in the GUI document. They also modify the systems that need to be modified to provide the functionalities of the knowledge monitoring subsystem 42 and knowledge maintenance reporting subsystem.

The knowledge flow specification 492 is implemented to ensure knowledge data integrity between the users of the knowledge base and the customers whose products they are supporting. If specifications were developed for procedures and systems to keep in synch the proposed knowledge base system 10 and the customer's knowledge base, they are implemented now. The systems development team accomplish the required call tracking integration by delivering the data and flow control vehicles between the knowledge base and the call tracking system 402 that were defined in the call tracking specification. If the customer owns the maintenance of the call tracking system 402, the coordination procedures detailed in the knowledge flow specification 492 are implemented.

Deployment plan 520 development

As shown in FIG. 2, also developed is the operational deployment plan 520 for deployment of the knowledge base system 10, including schedules, resource allocation, pilot incentives, and user documentation and training modifications. Tips for scheduling, training, agent motivation and metrics are suggested to make the integration of the program manageable and give birth to a knowledge culture that leads to continuous improvement of the program. A reporting Matrix is prepared to facilitate reporting and analysis of results. A metrics matrix diagrams what will be measured and how the measurements will be taken.

The deployment plan 520 includes plans for installing the knowledge base on the agents' desktop. This is a complex operation and should be done as early as possible. It is not necessary to have the final software to do this. The specifications for the work flow system 470 that were developed in the in-depth analysis phase 300 will be input in the development phase 500 to the modification of the user and knowledge administration training guides for the support team.

Deployment Phase 700

General

In the deployment phase 700, the knowledge base system 10 goes live and the knowledge base use process 410 is used to answer end-user queries. The operational processes 400 developed during the development phase 500 to monitor operations and to provide for continuous improvement are implemented. One of these processes is the above-mentioned knowledge maintenance process 450, through which new knowledge is developed and incorporated into the knowledge base. Another such process is the above-mentioned knowledge monitoring process 470, through which the use of the knowledge base system 10 may be evaluated and monitored.

CONCLUSION

Having described preferred embodiments of the invention, it will now become apparent to those of skill in the art that other embodiments incorporating its concepts may be provided. It is felt therefore that this invention should not be limited to the disclosed embodiments but rather should be limited only by the spirit and scope of the appended claims.

What is claimed is:

1. A method for selecting knowledge domains for knowledge bases, said method comprising:
   identifying a domain candidate set having at least one domain candidate for a knowledge base;
   developing a domain candidate benefit value for each said domain candidate, said domain candidate benefit value comprising a numerical value indicating a level of benefit of each said domain candidate associated therewith for becoming a selected knowledge domain for said knowledge base;
   conducting a comparison of each said domain candidate benefit value; and
   selecting said selected knowledge domain from said domain candidate set based on said comparison.

2. The method of claim 1, wherein developing said domain candidate benefit value further comprises:
   identifying goals for said knowledge base;
   identifying for said domain candidate set at least one forecasting attribute to forecast benefit extent, wherein said benefit extent comprises an extent of benefit, based on said goals, in selecting said domain candidate to be said selected knowledge domain;
   for each said forecasting attribute, identifying selected forecasting instantiations of said forecasting attribute;
   establishing said benefit extent for each of said selected forecasting instantiations; and
   developing an attribute valuation system to demonstrate said benefit extent for each of said selected forecasting instantiations, said valuation system developed by assigning an attribute benefit value to each of said selected forecasting instantiations, each said attribute benefit value comprising a numerical value indicative of said benefit extent of said forecasting attribute associated thereto; and
   for said domain candidate, developing an actual attribute value comprising numerical values and for each said forecasting attribute associated therewith, by developing an actual instantiation for said domain candidate;
   assigning, for each said forecasting attribute associated therewith, an actual attribute score from said attribute valuation system of said forecasting attribute, said actual attribute score based on said actual instantiation; and
   weighting said actual attribute score according to said goals to generate said actual attribute value; and
   combining each said actual attribute value for said domain candidate to generate said domain candidate benefit value for said domain candidate.

3. The method of claim 2, wherein said combining comprises summing each said actual attribute value.

4. The method of claim 2, wherein said forecasting attribute is measurable, and said actual instantiation is identified by measuring said forecasting attribute.

5. The method of claim 2, wherein said actual instantiation is identified by identifying a characteristic of said forecasting attribute.

6. The method of claim 2,
   wherein one of said goals comprises responding to requests for assistance;
   wherein said forecasting attribute comprises a domain candidate problem frequency comprising a frequency of problems involving said domain candidate; and
   wherein said actual attribute value comprises an actual domain candidate problem frequency value comprising a numerical value.

7. The method of claim 6, further comprising identifying said actual instantiation by measuring said domain candidate problem frequency with a percentage of queue metric comprising a percentage of requests for assistance involving said domain candidate compared to a total number of all requests for assistance.

8. The method of claim 2,
   wherein one of said goals comprises responding to requests for assistance;
   wherein said forecasting attribute comprises a first time fix frequency, which comprises a frequency that problems in said domain candidate are resolved in a first request for assistance; and
   wherein said actual attribute value comprises an actual first time fix frequency value comprising a numerical value.

9. The method of claim 8, further comprising identifying said actual instantiation by measuring said first time fix frequency with a first time fix rate metric.

10. The method of claim 2, further comprising organizing said forecasting attribute into sub-attributes, developing an attribute valuation system for said sub-attributes, and treating said sub-attributes as forecasting attributes when evaluating said domain candidate.

11. The method of claim 2,
wherein one of said goals comprises responding to requests for assistance;
wherein one of said forecasting attribute comprises an escalation frequency, which comprises a frequency that problems involving said domain candidate are forwarded for assistance in resolution; and
wherein said actual attribute value comprises an actual escalation frequency value comprising a numerical value.

12. The method of claim 11, further comprising identifying said actual instantiation by measuring said escalation frequency with a first metric comprising a rate of escalation to mentor metric, with a mentor escalation attribute score being assigned based on said rate of escalation to mentor metric.

13. The method of claim 12, further comprising:
measuring said escalation frequency with a second metric comprising a rate of escalation to customer metric, with a customer escalation attribute score being assigned based on said rate of escalation to customer mentor metric;
assigning an escalation to mentor attribute weight; and
assigning an escalation to customer attribute weight that is greater than said escalation to mentor attribute weight.

14. The method of claim 12, further comprising identifying said actual instantiation by measuring said escalation frequency with a rate of escalation to customer metric.

15. The method of claim 2,
wherein one of said goals comprises problem resolution by agents;
wherein one of said forecasting attributes comprises an extent of differences between a new agent and an experienced agent in said problem resolution involving said domain candidate; and
wherein said actual attribute value comprises an actual extent of differences value comprising a numerical value.

16. The method of claim 15, further comprising identifying said actual instantiation by measuring said extent of differences with an average handle time gap metric.

17. The method of claim 2, wherein one of said forecasting attributes comprises measurability, comprising an extent that said domain candidate can be measured, and wherein said actual attribute value comprises an actual measurability value comprising a numerical value indicative of said extent that said domain candidate can be measured.

18. The method of claim 17, further comprising identifying said actual instantiation by evaluating said measurability of said domain candidate to be measured by a series of measurability metrics.

19. The method of claim 18, wherein one of said goals comprises responding to requests for assistance by at least one agent and wherein said series of measurability metrics comprises:
a request measurement to measure a number of requests for assistance that are received about said domain candidate;
response satisfaction measurements to measure satisfaction of requesters with responses to said requests for assistance; and
quality measurements to measure an extent of quality of said responses; and wherein said series of measurability metrics are used to develop said actual measurability value comprising said numerical value indicative of said extent that said domain candidate can be measured.

20. The method of claim 2,
wherein one of said goals comprises responding to requests for assistance;
wherein one of said forecasting attributes comprises training that a team receives for said domain candidate; and
wherein said actual attribute value comprises an actual training value comprising a numerical value.

21. The method of claim 20, further comprising identifying said actual instantiation by measuring said training with a training metric to measure an amount of time spent training for a domain candidate, compared to a total amount of time spent training.

22. The method of claim 2,
wherein one of said goals comprises responding to requests for assistance;
wherein said forecasting attribute comprises a repetition frequency comprising a frequency of repetition of a problem in said requests for assistance involving said domain candidate; and
wherein said actual attribute value comprises an actual repetition value comprising a numerical value.

23. The method of claim 22, further comprising identifying said actual instantiation by measuring said repetition frequency with a repetition metric comprising a percent of times that a problem is repeated in said requests for assistance involving said domain candidate, compared to a total number of said requests for assistance involving said domain candidate.

24. The method of claim 2,
wherein one of said goals comprises responding to requests for assistance;
wherein said forecasting attribute comprises leverageability which comprises a leverageability extent, comprising an extent that knowledge about said domain candidate can provide benefit outside of said domain candidate; and
wherein said actual attribute value comprises an actual leverageability value comprising a numerical value.

25. The method of claim 24, further comprising identifying said actual instantiation by measuring said leverageability with a leverageability metric, wherein said leverageability metric is used to develop said actual leverageability value comprising said numerical value indicative of said leverageability extent.

26. The method of claim 1, further comprising, once said selected knowledge domain is selected, selecting a selected knowledge sub-domain for said knowledge base by:
identifying a sub-domain candidate set from said selected knowledge domain, said sub-domain candidate set having at least one sub-domain candidate;
developing a sub-domain candidate benefit value for each said sub-domain candidate, said sub-domain candidate benefit value comprising a numerical value and indicating benefit provided by said sub-domain candidate associated therewith in becoming said selected knowledge sub-domain;
conducting a comparison of said sub-domain candidate benefit values; and
selecting said sub-selected knowledge domain from said sub-domain candidates based on said comparison.

27. The method of claim 26, wherein said sub-domain candidate further comprises a functionality within said selected knowledge domain.

28. The method of claim 1, wherein said domain candidate is identified through a review of reports and surveys.

29. The method of claim 1, wherein said domain candidate set comprises a plurality of subjects.

30. The method of claim 1, wherein said domain candidate set comprises a plurality of functionalities within a subject area.

31. The method of claim 1, wherein said domain candidate, when said knowledge base is developed in support of a product, comprises troubleshooting, usage of said product, interoperability of said product with external applications, installation of said product and configuration of said product.

32. The method of claim 1, further comprising seeding said domain candidate set into said knowledge base, wherein said domain candidate benefit value further comprises a seeding priority value comprising a numerical value and indicating a level of importance of seeding said domain candidate into said knowledge base; and wherein said conducting a comparison step comprises conducting a first comparison of each said domain candidate benefit value; and further comprising, after said selecting step, providing a seeding order assignment to each said domain candidate, wherein said seeding order assignment identifies a numerical order in which each said domain candidate is to be seeded into said knowledge base; and wherein said providing step comprises:

assigning a first seeding order assignment to said selected knowledge domain;

removing said selected knowledge domain from said domain candidate set;

conducting a next comparison of each said domain candidate benefit value for each said domain candidate remaining in said domain candidate set;

selecting said next selected knowledge domain from said domain candidate set based on said next comparison;

assigning a next seeding order assignment to said next selected knowledge domain, wherein said next seeding order assignment indicates that said next selected knowledge domain is to be seeded next after said domain candidate that was just previously removed from said domain candidate set;

removing said next selected knowledge domain from said domain candidate set; and for each said domain candidate remaining in said domain candidate set, repeating said steps of conducting said next comparison, selecting said next selected knowledge domain, assigning said next seeding order assignment, and removing said next selected knowledge domain, until each said domain candidate has had assigned thereto said seeding order assignment.

33. The method of claim 32, wherein each said domain candidate comprises a sub-domain of a previously selected knowledge domain for said knowledge base.

34. The method of claim 1, further comprising:

recording each said domain candidate and said domain candidate benefit value associated therewith in a domain candidate benefit indicator in order to facilitate said comparison;

reviewing said domain candidate benefit indicator to identify a selected domain candidate comprising said domain candidate having said domain candidate benefit value associated therewith with a value greater than each other said domain candidate benefit value; and selecting said selected domain candidate as said selected knowledge domain.

35. The method of claim 15, further comprising identifying said actual instantiation by measuring said extent of differences with experience metrics to measure said extent of differences, wherein said experience metrics comprise a first time fix rate, an escalation rate, and a measurement of customer satisfaction with said problem resolution; and wherein said experience metrics are used to develop said actual extent of differences value comprising said numerical value indicative of said extent of differences.

36. A domain candidate benefit indicator for use in selecting knowledge domain candidates as knowledge domains for knowledge bases, said domain candidate benefit indicator comprising:

a domain candidate benefit value comprising a combination of actual attribute values for said domain candidate, each of said actual attribute values comprising numerical values and developed from an actual attribute score;

said actual attribute score developed by conducting an evaluation of a forecasting attribute of said domain candidate;

said actual attribute score indicative of an extent of benefit to a knowledge base of selecting said domain candidate as a selected knowledge domain, as indicated by said evaluation of said forecasting attribute; and weighting said actual attribute score according to selected goals to generate said each of said actual attribute values.

37. A method for developing seeding methodologies for seeding sub-domains into knowledge bases, said methodologies having preferred orders for seeding said knowledge bases with said sub-domains, said method comprising:

identifying a sub-domain set comprising at least one sub-domain in a selected knowledge domain for a knowledge base;

developing, for each said sub-domain, a seeding priority value that indicates a level of importance of seeding said sub-domain into said knowledge base, said seeding priority value comprising a numerical value indicative of said level of importance;

conducting a comparison of each said seeding priority value; and developing a preferred order for seeding each said sub-domain in said sub-domain set into said knowledge base based on said comparison.

38. The method of claim 37, wherein conducting said comparison of each said seeding priority value further comprises ranking each said sub-domain in order by numerical value of said sub-domain seeding priority value associated therewith, said ranking comprising:

assigning a first ranking to said sub-domain having said seeding priority value greater than each other said seeding priority value; and assigning a last ranking to said sub-domain having said seeding priority value lower than each other said seeding priority value; and developing said preferred order for seeding further comprises assigning a seeding order assignment for each said sub-domain in ascending numerical order based on said ranking, with said sub-domain having said first ranking assigned a first seeding position, and with said sub-domain having said last ranking assigned a last seeding position.

39. The method of claim 37, further comprising recording an identification of said sub-domains and their associated seeding priority values into a seeding methodology indicator in order to facilitate said ranking.

40. The method of claim 37, further comprising identifying a sub-domain seeding volume to indicate an extent of said seeding of each of said sub-domains prior to activation of said knowledge base, said sub-domain seeding volume comprising an estimate of how many records need to be entered into said knowledge base in order to capture knowledge about each said sub-domain.

41. The method of claim 40, further comprising identifying a domain seeding volume for said selected knowledge domain, said domain seeding volume calculated by summing each said sub-domain seeding volume for each said sub-domain.

42. The method of claim 40, wherein developing said methodology further comprises representing said methodology in a domain matrix detailing said preferred order for seeding and seeding information for each said sub-domain, said seeding information comprising said sub-domain seeding volume.

43. The method of claim 42, wherein said seeding information further comprises an identification of an extent of knowledge available about each said sub-domain and an identification of knowledge reservoirs for each said sub-domain.

44. The method of claim 37, wherein said identifying step comprises identifying said sub-domain by type of query to be used in accessing said knowledge about said knowledge domain.

45. A method of determining seed case priority for sub-domains of a domain for a knowledge base, said method comprising:

identifying a sub-domain set comprising at least one sub-domain in a selected knowledge domain for a knowledge base; and developing, for each said sub-domain, a seeding priority value that indicates a level of importance of seeding said sub-domain into said knowledge base;
said seeding priority value comprising a numerical value indicative of said level of importance; and
said seeding priority value determined by evaluating selected characteristics of said sub-domain.

46. The method of claim 45, wherein said characteristics comprise at least one of the following: an extent that users of said knowledge base will seed themselves, an extent that users of said knowledge base can seed themselves, and a diversity of questions that will be presented to said users.

47. The method of claim 45, wherein said sub-domain is a product, and said characteristics comprise at least one the following: product history, product complexity, and expected life cycle of said product.

48. A method for creating a knowledge base, comprising:

developing a domain candidate benefit indicator to identify a selected domain for said knowledge base, further comprising:
identifying a domain candidate set having at least one domain candidate for a knowledge base;
developing a domain candidate benefit value for each said domain candidate, said domain candidate benefit value comprising a numerical value indicating a level of benefit of each said domain candidate associated therewith for becoming a selected knowledge domain for said knowledge base;
recording each said domain candidate and said domain candidate benefit value associated therewith in a domain candidate benefit indicator;
reviewing said domain candidate benefit indicator to identify a selected domain candidate comprising said domain candidate having said domain candidate benefit value associated therewith with a value greater than each other said domain candidate benefit value; and
selecting said selected domain candidate as said selected knowledge domain;

identifying sub-domains of said selected knowledge domain; and developing a seeding methodology for seeding said knowledge base prior to activation of said knowledge base, said methodology comprising a preferred order for seeding said sub-domains and, for each of said sub-domains, an estimate of how many records need to be entered into said knowledge base in order to capture knowledge about each of said sub-domains.

49. The method of claim 19, wherein said quality measurements comprise a rate of escalation of problems to mentors, a rate of escalation of problems to customers, and a first time fix rate of resolving problems in a domain candidate on a first request for assistance; and wherein said quality measurements are used to develop said actual measurability value comprising said numerical value indicative of said extent that said domain candidate can be measured.

50. The method of claim 19, wherein said response satisfaction measurements comprise a measure of a total average handle time and a measure of the average handle time by said agent.

* * * * *